(12) United States Patent
Ruano

(10) Patent No.: US 12,299,756 B2
(45) Date of Patent: May 13, 2025

(54) COMPUTER-IMPLEMENTED METHOD FOR COMMUNITY ENERGY MANAGEMENT USING MIXED-INTEGER LINEAR PROGRAMMING, MODEL PREDICTIVE CONTROL, NON-INVASIVE LOAD MONITORING TECHNIQUES, ROBUST FORECASTING MODELS AND RELATED SYSTEM

(71) Applicant: UNIVERSIDADE DO ALGARVE, Faro (PT)

(72) Inventor: António Eduardo de Barros Ruano, Faro (PT)

(73) Assignee: UNIVERSIDADE DO ALGARVE, Faro (PT)

( * ) Notice: Subject to any disclaimer, the term of this patent is extended or adjusted under 35 U.S.C. 154(b) by 0 days.

(21) Appl. No.: 18/786,136

(22) Filed: Jul. 26, 2024

(65) Prior Publication Data

US 2025/0054081 A1 Feb. 13, 2025

(30) Foreign Application Priority Data

Jul. 31, 2023 (PT) .......................................... 118847

(51) Int. Cl.
*G06Q 50/06* (2024.01)
*G06Q 10/04* (2023.01)

(52) U.S. Cl.
CPC ............. *G06Q 50/06* (2013.01); *G06Q 10/04* (2013.01)

(58) Field of Classification Search
CPC ......... G06Q 50/06; G06Q 50/00; G06Q 10/04
See application file for complete search history.

(56) References Cited

U.S. PATENT DOCUMENTS

| 11,493,895 B2* | 11/2022 | Kopp | F24F 11/64 |
| 2011/0213739 A1* | 9/2011 | Benitez | G01D 1/14 |
| | | | 706/14 |

(Continued)

FOREIGN PATENT DOCUMENTS

| AU | 2021104760 A4 | 10/2021 |
| CA | 2809011 A1 | 5/2014 |
| CN | 111709589 A | 9/2020 |
| KR | 102350298 B1 | 1/2022 |

OTHER PUBLICATIONS

Giglio, Enrico et al.; "An Efficient Artificial Intelligence Energy Management System for Urban Building Integrating Photovoltaic and Storage"; Published Feb. 22, 2023, current version Feb. 27, 2023; IEEE Access; vol. 11; Journal pp. 18673-18688, document pp. 1-16 (Year: 2023)*

(Continued)

*Primary Examiner* — Emmett K. Walsh
*Assistant Examiner* — Michael C Moroney
(74) *Attorney, Agent, or Firm* — The Roy Gross Law Firm, LLC; Roy D. Gross

(57) ABSTRACT

The present invention relates to a computer-implemented method and respective system (100) for community energy management in a community comprising energy consumers and energy producers. Such a community energy management method and system (100) allow optimal energy sharing within energy communities. The method of the present invention is based on mixed-Integer linear programming, operating under the receding horizon concept of Model Predictive Control.
The system (100) comprises an aggregator computational unit (110) for the acquisition of data, a cloud-based server (115), a weather station (120), a database comprising tariff-related data (125), data acquisition subsystems (140) and a user interface (145).

14 Claims, 9 Drawing Sheets

(56) References Cited

U.S. PATENT DOCUMENTS

| | | | | |
|---|---|---|---|---|
| 2018/0041157 A1* | 2/2018 | Son | ............... | G05B 15/02 |
| 2018/0196896 A1* | 7/2018 | Arai | ............... | G01R 21/133 |
| 2019/0386511 A1* | 12/2019 | Takahashi | ............... | G06Q 50/06 |
| 2020/0076196 A1* | 3/2020 | Lee | ............... | H02J 3/008 |
| 2021/0006071 A1* | 1/2021 | Yamada | ............... | G06Q 30/02 |
| 2021/0158225 A1* | 5/2021 | Mimaroglu | ............... | G06N 20/20 |
| 2023/0418346 A1* | 12/2023 | Matthews | ............... | G06Q 50/06 |
| 2024/0095755 A1* | 3/2024 | Tieng | ............... | G06Q 50/04 |

OTHER PUBLICATIONS

Georgievski, Ilche et al.; "Optimizing Energy Costs for Offices Connected to the Smart Grid"; Dec. 2012; IEEE Transactions on Smart Grid; vol. 3, No. 4; Journal pp. 2273-2285, document pp. 1-13 (Year: 2012)*

W. Su & A. Huang (Eds.). (2018). The Energy internet: An open energy platform to transform legacy power systems into open innovation and global economic engines. Woodhead Publishing. https://doi.org/10.1016/C2016-0-04520-5.

A. Manso-Burgos, D. Ribó-Pérez, T. Gómez-Navarro, M. Alcázar-Ortega, (2022). "Local energy communities modelling and optimisation considering storage, demand configuration and sharing strategies: A case study in Valencia (Spain)" Energy Reports 8 (5): 10395-10408, DOI:10.1016/j.egyr.2022.08.181.

Instituto Nacional da Propriedade Industrial (INPI), Search Report for Portuguese Patent Application No. 118847, dated Dec. 5, 2023, 3pp.

* cited by examiner

COMPUTER-IMPLEMENTED METHOD FOR COMMUNITY ENERGY MANAGEMENT USING MIXED-INTEGER LINEAR PROGRAMMING, MODEL PREDICTIVE CONTROL, NON-INVASIVE LOAD MONITORING TECHNIQUES, ROBUST FORECASTING MODELS AND RELATED SYSTEM

CROSS REFERENCE TO RELATED APPLICATIONS

This application claims the benefit of priority of Portuguese Patent Application No. 118847, filed Jul. 31, 2023, the contents of which are all incorporated herein by reference in their entirety.

TECHNICAL FIELD OF THE INVENTION

The present invention relates to the field of renewable energy communities and house energy management systems, specifically using prediction models based on artificial intelligence algorithms.

BACKGROUND OF THE INVENTION

In 2019, to face the challenges presented by climate change, the European Union (EU) presented the European Green Deal strategy, which according to the EU aims to transform EU the first climate neutral continent by 2050 and decouple economic growth from resource use. It is expected that the European Green Deal will transform the EU into a modern, resource-effective, and competitive economy. Within the scope of energy, simultaneously with promoting the use of renewable energy sources, the EU presented a set of initiatives focused on the energy end-users. These initiatives focused on the end energy end-users trend to accelerate the change of power system organization paradigm, previously essentially centralized. Among these initiatives there is the promotion of prosumers (i.e., who both consume and produce energy) and stated that the decentralized production of energy by prosumers must constitute a relevant component of EU's energy policy. The appearance of prosumers has enhanced the appearance of so-called energy communities. According to the EU, Citizen Energy Community "is a voluntarily legal entity established at the local level for the local production of electricity, distribution, supply, consumption, aggregation, energy efficiency services, peer-to-peer energy trading, electric vehicles, and energy storage, etc." Although with similar definitions, a Renewable Energy Community considers only production from renewable sources, and includes different aspects such as electricity, thermal, gas and water. Other definitions have been proposed for energy communities, such as "a group of buildings with low-carbon technologies to supply, store and internally share/trade electricity and heating", "a group of consumers and/or prosumers, that together share generation units and electricity storage", and even "community energy" and "energy community" are found in literature. According to EU estimates, by 2030 energy communities can account for 17% of all installed wind capacity and 21% of all photovoltaic capacity installed in the EU. Thus, it is possible to anticipate the great impact of energy communities in the future. However, it is not only necessary to create energy communities, but more importantly, it is necessary to develop intelligent and sustainable communities, and for this it is necessary to develop efficient energy management systems for energy communities.

PRIOR ART

[1] W. Su, A. Huang, in "The energy internet: An open energy platform to transform legacy power systems into open innovation and global economic engines", Woodhead Publishing, 2018 proposes an energy management system is developed for energy communities. In fact, two models are developed. In the first the model for house energy management systems is presented, i.e., when houses operate separately, and then a model where houses can exchange energy with each other. In both cases the objective is the minimization of operation costs. In the first case the objective is the minimization of house operation costs and the second the minimization of community costs. The results show that it is possible to reduce community costs when houses operate together, but some houses can see their cost increases in favour of a collective cost reduction goal.

[2] A. Manso-Burgos, D. Ribó-Pérez, T. Gómez-Navarro, M. Alcázar-Ortega, in "Local energy communities modelling and optimisation considering storage, demand configuration and sharing strategies: A case study in Valencia (Spain), Energy Reports." 8 (2022) 10395-10408 proposes an optimization for local energy communities, with a case study in Spain. Different sharing strategies are considered among community participants through different allocation coefficients, such as static and variable coefficients. The authors consider that static coefficient fixed throughout the year and variable coefficient changing every hour. An analysis is made to assess the impact of increasing battery capacity on system operation.

Patent application CA2809011 A1, "Adaptative energy management system", priority date Nov. 6, 2012, published May 6, 2014, MacMaster University, CA, discloses systems, methods and devices related to a microgrid system for providing power to a facility. A self-contained power system provides power to a facility using a combination of power storage elements and renewable energy sources. A connection to an external power grid may also be provided. The system optimizes power flow to the facility using power from the storage elements and the renewable energy sources and, if necessary, the external power grid. The optimization process predicts future power usage by the facility using power usage data from a predetermined time window. The optimization process can also take into account predicted energy generation amounts by the renewable energy sources. To optimize economic effects, the optimization process can also determine whether to buy and when to buy power from the external power grid.

Although there is a great interest in the subject of energy communities, the literature fails to present complete solutions, that are able to adapt to communities having houses with completely different situations in terms of consumption and production, or storage of energy. In addition, the discussion on the form of energy sharing within energy communities is in a very initial phase, namely when it comes to the allocation coefficients, which are addressed in this application.

SUMMARY OF THE INVENTION

The present invention refers to a computer-implemented method and respective system for community energy management in a community comprising energy consumers and energy producers. Such a community energy management method and system allow optimal energy sharing within energy communities, as it is a central system that makes the global management of the entire community. The method and system of the present invention is based on mixed-Integer linear programming (MILP), operating under the receding horizon concept of Model Predictive Control (MPC). A systematic classification of electric appliances used in the houses of the community, the use of external information such as weather information, as well as the use of intelligent forecasting techniques enables the present invention to achieve an excellent efficiency. It also allows for an easy installation of as well as a smooth scaling with an increasing number of houses. The community energy management method formulations include sharing of energy without restrictions, as well as employing different allocation coefficients strategies.

In a first aspect, the present invention refers to a computer-implemented method community energy management.

In a second aspect, the present invention relates to a system configured to implement the method of the first aspect.

In a third aspect, the invention refers to a computer program product comprising instructions that are able to carry out the method steps when executed in a computer.

In a fourth aspect, the invention refers to a computer-readable storage medium comprising instructions that are able to carry out the method steps when ran in a computer.

Solution to Technical Problem

The present invention addresses the problem of energy management of a community of houses by proposing complete, highly efficient, and user-defined community technical solutions which implement sharing of electric energy produced and/or stored by its members. It is a complete solution since it details all hardware and software needed to implement community energy management, such hardware and software being described in the appended claims of the present application. It allows the community to decide the methodology of energy sharing among a set of pre-defined and implemented techniques, easily extendable to other approaches. Finally, for the chosen sharing technique, it provides a highly efficient solution as: a) MILP provides an optimal solution to the community economic cost, according to the data used, adapting naturally to changes of equipment usage; b) the forecasts necessary in the MILP formulation are among the more accurate available worldwide due to: i) the use of state-of-the-art robust forecasting models; ii) the division of electric appliances into four classes, which significantly reduces the uncertainty of power consumption in each house in the community.

Advantageous Effects of the Invention

As advantageous effects of the present invention, the following can be listed:

A—The proposed invention enables to implement sharing of electric energy within a community, as well as the management of energy transfer with the grid, using several different criteria, whether pre-programmed or user-defined.

B—By classifying the types of Electrical Appliance between Monitored (M)/Not Monitored (NM), Controlled (C)/Not Controlled (NC), and Manually-Controlled (MC)/Computer-Controlled (CC), it enables, on one hand, a better forecasting of the power demand of each house within the community, and, on the other hand, allows the user to set suitable schedules for User-Controlled devices (for instance, thermo-accumulators), as well as settings and control algorithms for Computer-Controlled devices (for instance, Air-Conditioners or swimming-pool pumps).

C—The operation and power consumption of Monitored devices can be estimated and forecasted using Non-Invasive Load Monitoring (NILM) techniques.

D—Power consumption of Not Monitored devices, as well as power produced by the (photovoltaic apparatus) PV installations, must be forecasted within the Prediction Horizon (PH). Typically, with, for example, a time-step of 15 minutes, if the PH is 24 hours, this means that the forecasts must be available for 96 steps-ahead. To speed-up the calculations, this period is divided into two sub-periods, as an example: for the last 15 hours, naïve forecasting is used; for the first 9 hours, the forecasts are obtained using Robust Forecasting models, which are an ensemble of models, designed not only to minimize the forecasting errors within PH, but also ensuring Prediction Intervals.

E—C) and D) enable the power demand of each house, as well as its forecast within PH, to be divided between NM demand and M demand. As the larger uncertainty is related with NM demand, this decreases the total forecasting error.

F—The control of all CC devices, including inverters and/on batteries for all houses are obtained by solving, at each time-step, a MILP problem, formulated with the selected energy shared criterion, using the NM and M demand and PV forecasts, over PH, and energy selling/buying grid tariffs.

G—As at each time-step, a new Mixed-Integer Linear Programming (MILP) problem is solved, in a Receding Horizon Scheme, the energy management scheme adapts to new situations (for instance the initial operation of a dishwasher, which is not controlled, but monitored using NILM.

H—All this computation is done in an aggregator computational unit (a software executing in a computer), which can reside in one of the houses, or in a separate energy management company. Data is received/sent wirelessly between each house and the aggregator computational unit, using data acquisition systems in each house.

BRIEF DESCRIPTION OF THE FIGURES

Preferred embodiments of the present invention will be described with reference to the accompanying figures, which are to be construed as non-limiting the invention scope, which scope is defined by the appended claims, and wherein:

DETAILED DESCRIPTION OF THE INVENTION

Figure 1A:
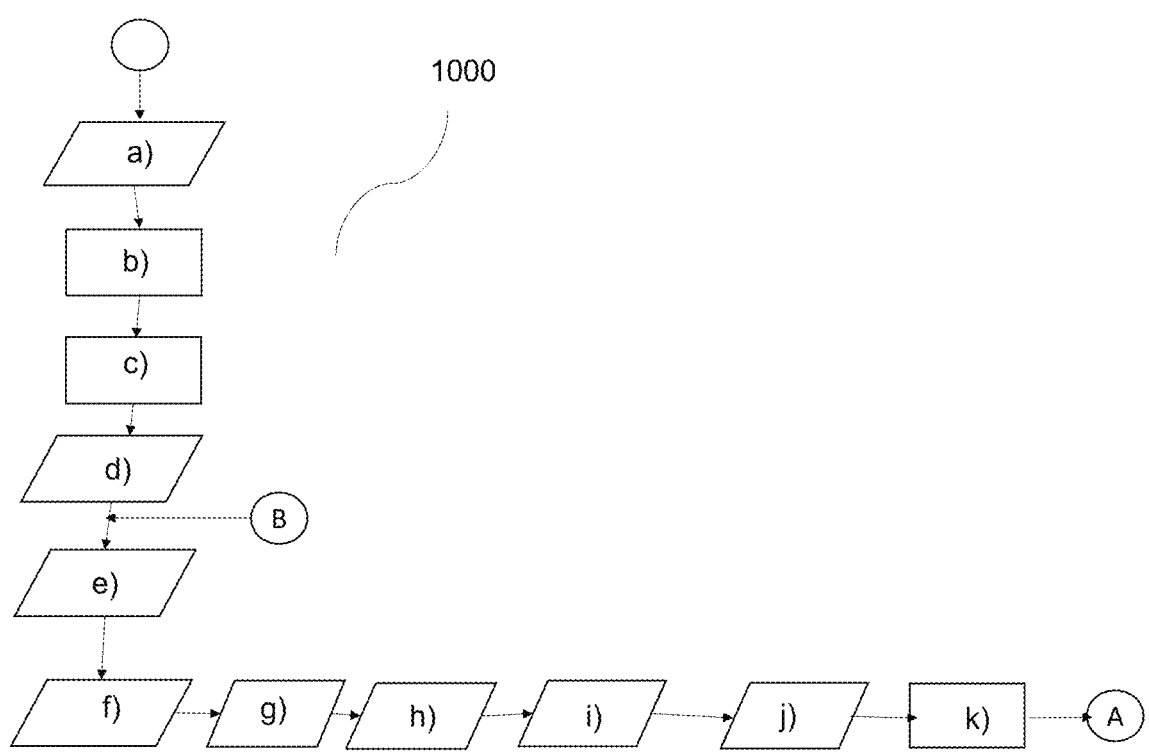
FIGS. 1A and 1B—illustrate a flowchart representing the method steps according to an embodiment of the present invention.
Figure 1B:
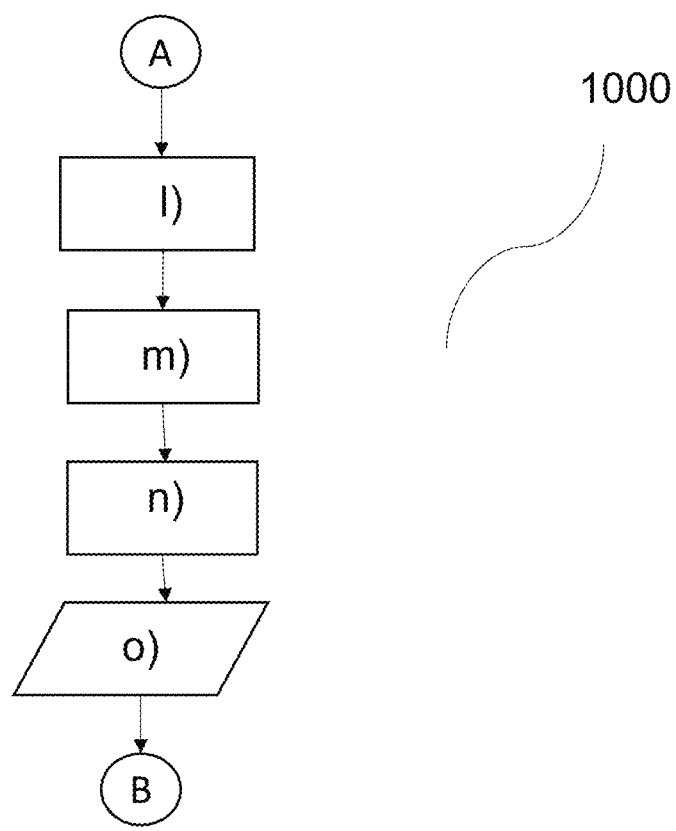

The present invention relates to a computer-implemented method for community energy management and to a system configured to implement said method.

In the following detailed description, the method steps will be described, (method steps are indicated between brackets below) together with the system object of the present patent application. Also the figures annexed will be referred to, for better clarification.

1—Data $d_0$ acquisition (step a)), by an aggregator computational unit (110), during a minimum period of time of 15 days, typically during one month, wherein data do comprises at least one of the following data:

{tws}—Time basis for weather data;
{R}—Global Solar Radiation;
{T}—Atmospheric Air Temperature For every house h:
{$t_{Cons}$}—Time basis for Consumption data;
{$P_h$}-Active power of house h
{$R_h$}—Reactive power of house h
{$t_{Inv}$}-Time basis for Inverter data;
{$P_h^{PV}$}—AC Power generated by the PV installation of house h
{$O_h$}—Daily Occupation of house h For every house h that has Manually Controlled Appliances:
$StP_{h,j}/EndP_{h,j}$, j∈{$MC_h$}—Start/end times of the operation of all Manually Controlled (MC) appliances of house h.
{$P_{h,j}$, J∈{$MC_h$}}—Active Power of all Manually Controlled appliances of house h.
{$t_{MCh}$}—Time basis for all Manually Controlled appliances of house h.

For every house h that has Computer Controlled Appliances (not Acs):
{$U_{h,j}$, j∈{$CC_h$}} Control Actions for all appliances of house h to be Computer Controlled (CC)
{$P_{h,j}$, j∈{CC}}—Active Power of all appliances of house h to be Computer Controlled
{$t_{cCh}$}—Time basis for all Computer Controlled appliances of house h.

For every house h that has Computer Controlled ACs:
{$IT_h^{room}$, room∈{$AC_h$}}—Air temperature for all ACs of house h to be Computer Controlled
{$RHP_h^{room}$, room∈{$AC_h$}} Relative humidity for all ACs of house h to be Computer Controlled
{$WT_h^{room}$, room∈{$AC_h$}} Wall temperature for all ACs of house h to be Computer Controlled
{$P_h^{room}$, room∈{$AC_h$}} Active Power for all ACs of house h to be Computer Controlled {$U_h^{room}$, room∈{$AC_h$}} Control Actions for all ACs of house h to be Computer Controlled
{$t_{ACh}$}—Time basis for all ACs of house h to be Computer Controlled For every house h that has Monitored but not Controlled (M) appliances:
$StP_{h,j}/End_{h,j}$, j∈{M}—Start/end times of the operation of all Monitored (M) appliances of house h.
{$P_{h,j}$, j∈{$M_h$}}—Active Power of all Monitored appliances of house h.
{$t_{Mh}$}—Time basis for all Monitored appliances of house h.

2—Model Design Procedure (step b))

The following procedure is employed for model design:
1. Selection of the datasets from the available design data by using, for example, ApproxHull [3];
2. Minimization of the different objectives, by formulating a Multi-Objective Genetic Algorithm (MOGA);
3. Analysis of MOGA results, restricting some of the objectives and redefinition of the input space and/or the model topology;
4. Usage of the preferential set of models obtained from the second MOGA execution;
5. Determination of $m_e^{pref}$ using (1);
6. From $m_e^{pref}$ obtain $m_e^{par}$ using (2);
7. If the model that should be designed is a Nonlinear Auto-Regressive model with Exogeneous (NARX) model, usage $m_e^{par}$ for the exogenous variables;
8. Obtaining the prediction intervals using (3)

The set $m_e^{pref}$ is defined as:

$$m_e^{pref} = \left\{ m_{pref}: nw(m_{pref}) \leq \tilde{m}_{nw}^{pref} \right\} \cap \left\{ m_{pref}: \text{fore}(m_{pref}) \leq \tilde{m}_{fore}^{pref} \right\} \quad (1)$$

where $m_{pref}$ is the set of preferred models obtained in the $2^{nd}$ MOGA execution, $\tilde{m}_{nw}^{pref}$ is the median of the linear weight norm for each model in $m_{pref}$ and $\tilde{m}_{fore}^{pref}$ the median of the sum of the forecasts for the prediction time-series obtained by models $m_{pref}$.

The third subset of models, $m_e^{par}$, is obtained iteratively, by adding non-dominated models, considering nw(.) and fore(.) as the two criteria, until NS models are found. Initially, the set of models to be inspected, $m_i$ is initialized to $m_e^{pref}$, and $m_e^{par}$ to an empty set. In each iteration, both criteria are applied to $m_i$. Then, the non-dominated solutions found are added to $m_e^{par}$ and removed from $m_i$.

$$m_e^{par} = \{nd(\text{fore}(m_e^{pref}), nw(m_e^{pref})): \#nd = NS\} \quad (2)$$

The prediction intervals are obtained as:

$$\underline{\tilde{y}}_k = \tilde{y}_k - \Delta \tilde{y}_k \leq y_k \leq \tilde{y}_k + \Delta \tilde{y}_k = \overline{\tilde{y}}_k \quad (3)$$

$$\Delta \tilde{y}_k = t_{1-\alpha/2, N-p} \sigma_{tot}$$

Where $t_{1-\alpha/2, N-p}$ represents the α/2 quantile of a Student's t-distribution with N-p degrees of freedom. The total prediction variance for each prediction can be obtained as:

$$\sigma_{tot}^2 = \sigma_\varepsilon^2 \left( 1 + \varphi^T(x_k, v*) (\Gamma^T(Z_{tr}, v*) \Gamma(Z_{tr}, v*))^{-1} \varphi(x_k, v*) \right) \quad (4)$$

where v* denotes the optimal value of the nonlinear parameters and the data noise variance, $\sigma_\varepsilon^2$, can be estimated as:

$$\hat{\sigma}_\varepsilon^2 = \frac{\sum_{k=1}^{N} e_k^2}{N-p} = \frac{\sum_{k=1}^{N}(y_k - \breve{y}(z_k))^2}{N-p}, \quad (5)$$

Where N denotes the total number of samples and p the number of model parameters.

For classification models no forecasting criterion such as (62) is employed. In this case, criteria such as $FP_{tr}$, $FN_{tr}$, $FP_{te}$, $FN_{te}$ are employed, where FP and FN denote the number of False Positives and False Negatives, respectively. Additionally, $m_e^{par}$ will be the set with the smallest NS linear weight norm.

3—Determination of power profiles (step c)) for all monitored, manually controlled and computer-controlled appliances by computing the mean value of power consumption during all sampling intervals within a period of time, for example, within a day.

4—Initializations (step d))

Before executing the system, the information described in the heading Parameters, below, must be supplied. For each battery bank, the initial SOC value must be supplied.

Additionally, as several data-based models are used, they need to be designed first. The ANN models described in the heading Models, below, need around 1 month of data to be designed, using the methods described before. This way, this amount of data needs to be acquired. Additionally, for each appliance that will be manually controlled, its consumption profile needs to be determined, which also requires data. All this data can be measured by Wi-fi Smart Plugs devices, available commercially, connected to the data acquisition of each house.

Parameters

For the community:
Energy sharing method, with possible coefficient values
For all Houses with PV:
  $\overline{P}_h^{Grid-}/\overline{P}_h^{Grid+}$ Contracted bought(−)/sold(+) power from/to the grid by house h
For all houses with PV and Battery Bank:
  $\overline{P}_h^{B-}/\overline{P}_h^{B+}$ Maximum discharged (charged) power of the battery bank of house h
  $\underline{SoC_h}/\overline{SoC_h}$ Minimum/Maximum value of the state of charge of the battery bank of house h
  $SoC_{h,initial}$ Initial state of charge of the battery bank of house h
  $RU_h/RD_h$ Maximum values of the ramp-up/ramp down rates for charging or discharging of the battery bank of house h
  $\eta_h^{B-}/\eta_h^{B+}$ Charging/discharging efficiency of the battery bank of house h
  $E_h^B$ Rated capacity of battery bank of house h
For All Houses with Computer-Controlled Acs (Air Conditioning Systems):
  $t_s$ Start time when a room must be in thermal comfort
  $t_e$ End time when a room must be in thermal comfort
  $\Delta t$ Time before the start of the schedule when the AC might need to operate to ensure thermal comfort throughout the whole period
  $\Theta_T$ PMV (Predicted Mean Vote) threshold, typically assuming the value of 0.5

Models $M^T$ Forecasting Temperature Model
$M_h^P$ Forecasting Consumption Model for NMC appliances of house h
$M^R$ Forecasting Radiation Model
$M_h^{PV}$ Forecasting PV Power Model for house h
$M_{h,j}^C$ Classifier model for monitored appliance j of house h 5—Data acquisition (step e))

A data acquisition system was developed and installed in a house.

In the example of implementation of the present invention, the consumption of the house is measured by a Carlo Gavazzi (EM340) 3 phase imported energy meter. This meter is a certificated device, and electrical measurement is done using a 2-wires Modbus RTU connection. EM340 supplies 45 different electric variables, sampled at 1 Hz. Variables related with the energy produced by a photovoltaic apparatus (PV), stored in a battery and injected in the grid are available from a Kostal smart energy meter (SEM). In total, 21 variables are obtained by KI, at a sampling interval of 1 min. The data access is done using a cable IP network using the Modbus IP protocol. Smart Plugs (SP) are used for on/off control of some equipment. Additionally, they allow sockets belonging to the same CB to be measured individually. This type of devices connects to an existing wireless network using an initial access point and a manufacturer mobile app. They can be read/controlled using a cloud API or directly using an internal web service, which is the case here. A smart Plug (180) is represented in FIG. 4.

Figure 2:
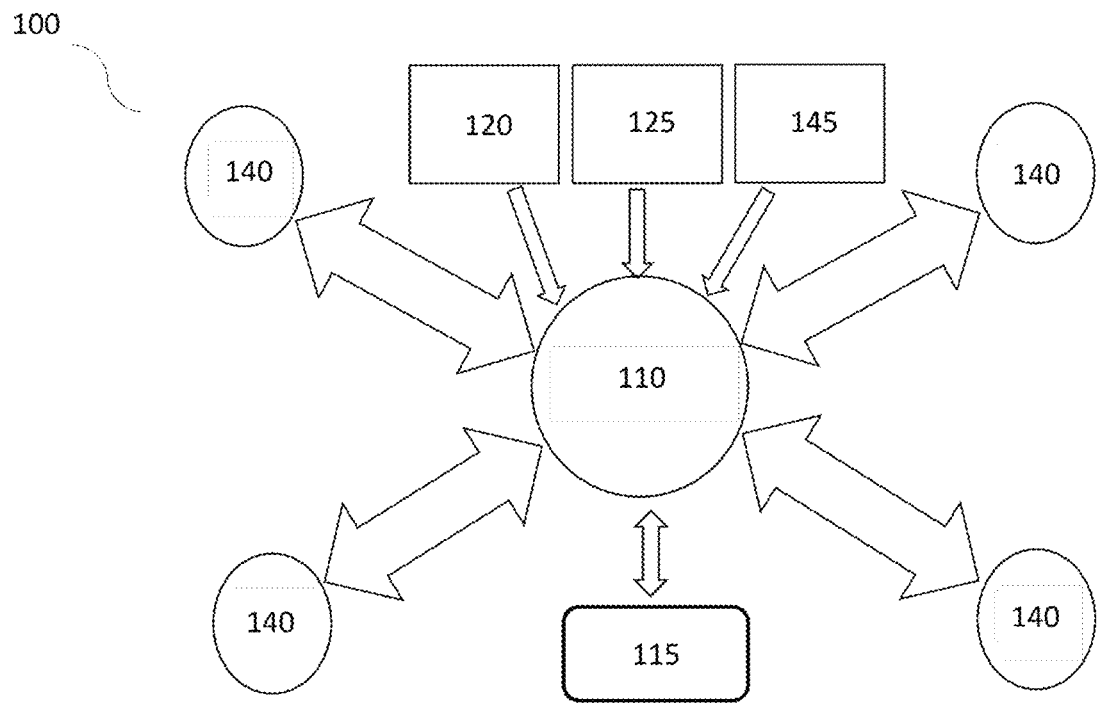
FIG. 2—illustrates a schematic diagram representing the system according to an embodiment of the present invention.

An Intelligent Weather Station (IWS) (120) represented in FIG. 2 is a device that measures the air temperature and relative humidity, and global solar radiation, and predicts their evolution within a self-defined prediction horizon. To enable these forecasts, a two stages strategy is employed. When little measured data are available, a nearest neighbor algorithm is employed. When enough data are available, neural networks predictive models are automatically off-line designed and uploaded to the IWS, for real-time use.

Figure 4:
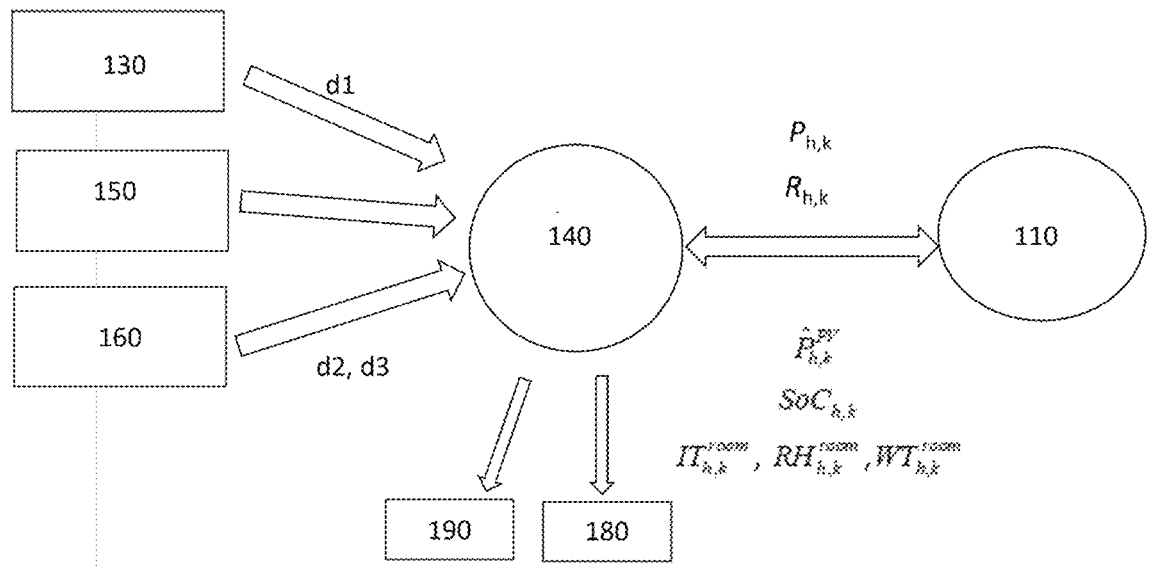
FIG. 4—illustrates a schematic diagram representing an embodiment of a part of the system according to the present invention.

Finally, Self-Powered Wireless Sensors (SPWS) (150), represented in FIG. 4, are used for measuring room data, such as air temperature and relative humidity, status (open/close) of doors and windows, walls temperature, light and room movement. They are Ultra-Low-Power devices and communicate via ISM radio band working on 2.4 GHz or 868 MHz frequencies. They can be used to measure thermal comfort for usage in predictive control of air-conditioners in the house.

Gateways and a Technical Network are tasked with data transmission from/to the measurement devices. A technical IP-cabled and a wireless network have been created using a network router located inside an extension of the electric board case. This router separates the home network from the technical network. All devices, except the SPs and SPWS, are connected to that network. To perform the data acquisition from the existing devices EasyGateway devices are used. EasyGateway is a fault-tolerant IoT gateway that supports a variety of reception/acquisition protocols such as Modbus, SNMP, Easymodules and serial http, as well as a set of DataDelivered Connectors (DDC). The data transmission of the EasyGateways is always performed at a 1-min base, which means that the data acquired by the measurement devices related to each gateway are packed and transmitted at that rate. Control of electrical equipment is performed via Modbus.

The gateways can also send data to up to three different DDCs. Here, 2 DDCs and 2 IoT Platforms are used. One platform is used inside home, employing an EasyMqs DDC and another, using a Generic Ampq DDC, is in the cloud. Depending on where the aggregator resides, the former or the latter can be used. The same IoT platform is used inside home and in the cloud. It receives data from the configured message queue servers. The data arrived pass by a set of configured plug-ins for each type of entities configured on the platform. The application provides a web page where the end-user can configure a set of definitions related to data storage and management. It also allows data visualization using plots grouped by sensors category, and data download in 4 standard formats, csv, xlsx, mat and npz. For a more detailed description of the IoT platform, see [4].

6—Control Actions (step f) determined in the previous step, by the aggregator computational unit (110) sending to each data acquisition subsystem (140), which, on its turn, sends the respective control actions to the computer-controlled devices in each house of the community, via modbus;

7—Data reception by an Intelligent Aggregator (steps g), h), i), i)

Figure 3:
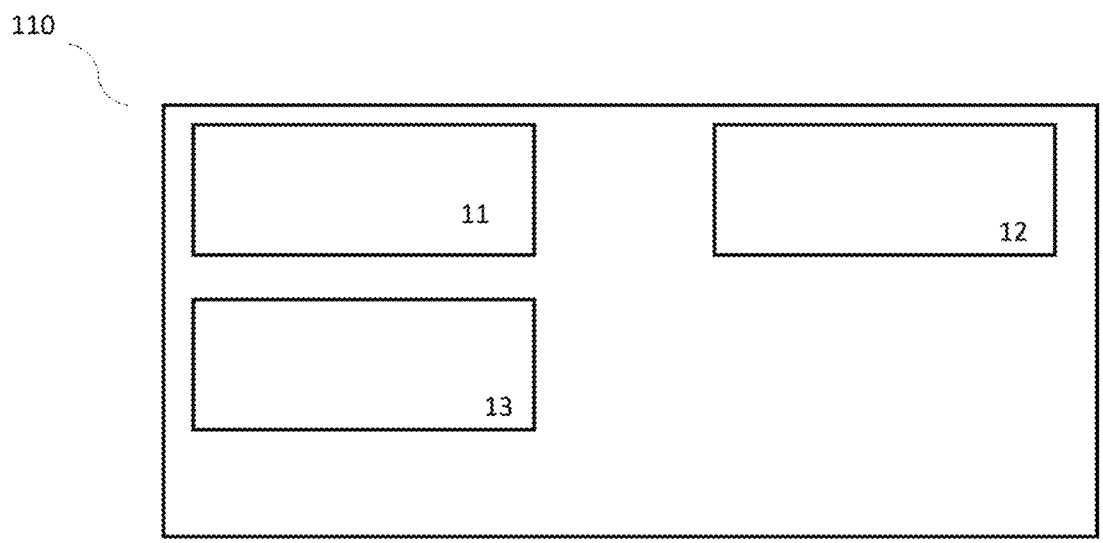
FIG. 3—illustrates schematically an aggregator computational unit according to an embodiment of the present invention.

The concept of the intelligent aggregator for community energy management system is represented in FIGS. 2 and 3.

The aggregator computational unit (110) is a computational unit that receives information about:
- weather parameters—Air Temperature (T) and Solar Radiation (R)—from possibly a weather station, such as described above or collected by an internet application that, on one hand, is valid for all houses in the community and, on the other hand, measures or interpolates these values at the sampling interval considered (15 minutes);
- Tariffs employed in the energy prices, both from the point of view of purchasing as well as selling, for the current sample and for all future samples within a Prediction Horizon (PH), for example of 24 hours;
- Daily occupation (number of occupants) for each house (current and next day), inserted by a user:
- Electric information related with the electric consumption of each house, sent by the consumption energy meter:
  $P_{h,k}$—Active power of house h at instant k;
  $R_{h,k}$—Reactive power of house h at instant k
  information regarding possible PV installation, sent by the inverter energy meter:
  $\hat{P}_{h,k}^{PV}$—AC Power generated by the PV installation of house h at instant I
- possible energy storage, sent by the inverter energy meter:
  $SoC_{h,k}$—State of charge of the battery bank of house h at instant k
- And possible climate information (Air temperature ($IT_{h,k}^{room}$), Relative humidity ($RH_{h,k}^{room}$), Wall temperature ($WT_{h,k}^{room}$) about each room in house h that is computer-controlled using Predicted Mean Vote (PMV), at instant k.

This information is sent wirelessly from the data acquisition of house h to the aggregator every sampling interval (for example, 15 minutes). Additionally, if there are appliances that should be monitored in house h, Active and Reactive Power sampled at, for example, 1 minute interval are also sent to the aggregator. If there are appliances that should be computer controlled in house h, then its data acquisition system receives from the aggregator, at each sampling interval, the corresponding actuation signals (in the case of battery control, the actions of charging the battery from the PV/discharging the battery; in the case a swimming pool pump, the on/off actuation signal; in the case of PMV control of air conditioners the on/off actuation signal and the reference temperature). The data acquisition system should supply these actuation signals to the corresponding device. Different acquisition systems can be used, provided they satisfy the above specifications. A data acquisition system according to the present invention is represented in FIG. 4.

8—Determination of the averaged active power consumption of each house (step k), by using:

$$P_{h,k} = \frac{P_{h,k_1}}{N}, N = \frac{\Delta k}{k_1}$$

9—Forecasts (step I))

Figure 5:
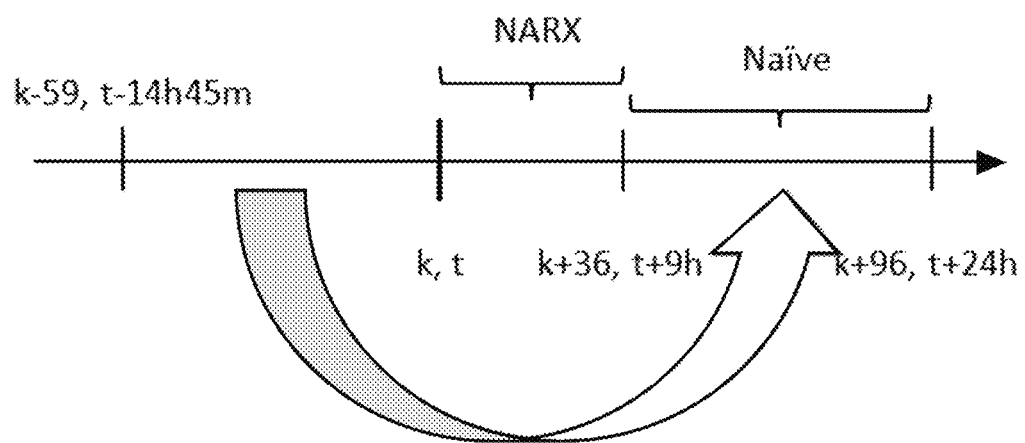
FIG. 5—illustrates a hybrid forecasting scheme used in embodiments of the present invention.

To implement the MILP-MPC approach, there is the need for forecasting both the consumption of each individual household and the PV generation of each PV system over the PH (obviously the community versions are just a sum of the values for the individual houses). Their forecasting, unless specified, is obtained as the joint usage of naïve forecasting and the use of multi-step NARX forecasting models, as FIG. 5 illustrates.

9.1—Electric consumption (substep I1) (EXAMPLE)

We have divided the appliances in four types, mainly because of the way that their forecasts are obtained. The forecast of the active Power of House h at instant k, within the Prediction Horizon, can be given as:

$$\hat{P}_{h,\{k+1...k+PH\}} = \hat{P}_{h,\{k+1...k+PH\}}^{NMC} + \hat{P}_{h,\{k+1...k+PH\}}^{NC} + \hat{P}_{h,\{k+1...k+PH\}}^{MC} + \hat{P}_{h,\{k+1...k+PH\}}^{CC} \quad (6)$$

Forecasting of House h not Monitored Neither Controlled Consumption Within the Prediction Horizon $$\hat{P}_{h,\{k+1...k+PH\}}^{NMC} = \sum_{j=1}^{\#((NM_i) \cup \{NC_i\})} \hat{P}_{h,j,\{k+1...k+PH\}} \quad (7)$$

$$\hat{P}_{h,\{k+1...k+PH\}}^{NMC} = \hat{P}_{h,\{k+1...k+36\}}^{NMC} \cup \hat{P}_{h,\{k+37...k+PH\}}^{NMC} \quad (8)$$

Equation (7) states that the not monitored neither controlled consumption is the sum of the active power of corresponding appliances. The naïve forecasting is obtained as:

$$\hat{P}_{h,\{k+37...k+PH\}}^{NMC} = \hat{P}_{h,\{k-59...k\}}^{NMC} \quad (9)$$

The first 9 hours of forecasting are obtained by a RBF NARX model:

$$\hat{P}_{h,\{k+1...k+36\}}^{NMC} = \{M_h^P(\overline{P}_{h,l}^{NMC}, \overline{T}_l, O_{h,l}, D_l), l = k+1 \ldots k+36\} \quad (10)$$

Equation (8) states that the forecasting of the first 36 steps for the NMC consumption of house h are obtained as a multi-step forecasting of model $M_h^P$, which uses past values (relative to I) of that consumption ($\bar{P}_{h,I}^{NMC}$), past values of the atmospheric air temperature ($T_I$), the current occupation of the house, and a codification of the corresponding day ($D_I$). Notice that it is assumed that the community houses are near enough so that we can consider there is no spatial variation of the atmospheric temperature.

TABLE 1

Day of the week and holiday occurrence encoding values

| Day of the week | Regular day | Holiday | Special |
|---|---|---|---|
| Monday | 0.05 | 0.40 | 0.70 |
| Tuesday | 0.10 | 0.80 | |
| Wednesday | 0.15 | 0.50 | |
| Thursday | 0.20 | 1.00 | |
| Friday | 0.25 | 0.60 | 0.90 |
| Saturday | 0.30 | 0.30 | |
| Sunday | 0.35 | 0.35 | |

The encoding, presented in table 1, distinguishes the day of the week and the occurrence and severity of holidays based on the day they occur. The regular day column shows the coding for the days of the week when these are not a holiday. The following column presents the values encoded when there is a holiday, and finally, the special column shows the values that substitute the regular day value in two special cases: for Mondays when Tuesday is a holiday; and, for Fridays when Thursday is a holiday.

As the forecasts of the NMC consumption depend on the forecasts of the atmospheric temperature, another model, in this case a NAR model must be used to obtain these forecasts.

$$T_{\{k+1...k+36\}} = \{M^T(T_l), l = k+1 \ldots k+36\} \tag{11}$$

Forecasting of House h monitored but not controlled consumption within the Prediction Horizon $$\hat{P}_{h,\{k+1...k+PH\}}^{NC} = \sum_{j=1}^{\#(\{M_i\} \cap \{NC_i\})} \hat{P}_{h,j,\{k+1...k+PH\}} \tag{12}$$

The forecasting can be obtained using Algorithm (Alg.) 1:

---

Alg. 1-Forecasting of House h monitored but not controlled consumption of appliance j within the Prediction Horizon

---

\# Inputs
$\quad$ \# $P_{h,\{\underline{k}_1...\bar{k}\}}, R_{h,\{\underline{k}_1...\bar{k}\}}, OP_{h,\{\underline{k}_1...\bar{k}_1\}}, \hat{P}_{h,\{\underline{k}_1...\bar{k}_1\}}$
\# Outputs
$\quad$ \# $OP_{h,j,\{\underline{k}...\bar{k}\}}, \hat{P}_{h,j,\{\underline{k}-1...\bar{k}\}}, \hat{P}_{h,j,\{k+1...k+PH\}}$
$StP_{h,j} = 0$
$EndP_{h,j} = 0$
for i=1:15
$\quad k_1 = (k-1)*15+i$
$\quad [OP_{h,j,k_1}, \hat{P}_{h,j,k_1}] = $ NILM (h, j, $P_{h,\{k_1-10...k_1-1\}}$, $R_{h,\{k_1-10...k_1-1\}}$, $\hat{P}_{h,j,\{k_1-10...k_1-1\}}$)
$\quad$ if $OP_{h,j,k_1} = 1$
$\quad\quad$ if $OP_{h,j,k_1-1} \neq 1$
$\quad\quad\quad StP_{h,j} = k_1$
$\quad\quad$ end

---

Alg. 1-Forecasting of House h monitored but not controlled consumption of appliance j within the Prediction Horizon

---

$\quad$ else
$\quad\quad$ if $OP_{h,j,k_1-1} = 1$
$\quad\quad\quad EndP_{h,j} = k_1$
$\quad\quad$ end
$\quad$ end
end
$\hat{P}_{h,j,\{k+1...k+PH\}} = $ UpdateProfileMNC (i, j, $StP_{h,j}$, $EndP_{h,j}$, $OP_{h,j,\{\underline{k}...\bar{k}\}}$, $\hat{P}_{h,j,\{\underline{k}...\bar{k}\}}$, k)

---

In Alg. 1, $OP_{h,j,k}$ denotes the Operation Status (0—Off; 1—On) of appliance j at house h at instant k. $R_{h,j,k}$ is the reactive power of the main meter of house h at instant k. $StP_{h,j}/EndP_{h,j}$ denote the start/end sample index of the operation of appliance j of house h.

It should be noted that NILM operates with data sampled at 1 minute, not with a 15 minutes sampling interval. The symbol $k_1$ denotes sample indexes with a sampling interval of 1 min. The relation between $k_1$ and k is $k \rightarrow k_1 \in \{(k-1)*15+1 \ldots k*15\}$. The first index of $k_1$ is denoted as $\underline{k}$ while the last one is $\bar{k}$.

At each minute, the NILM operation for appliance j at house h is executed. If the appliance is operating ($OP_{h,j,k}=1$), then the corresponding power estimation is performed ($\hat{P}_{h,j,k}$). The algorithm then determines if the start of the operation and the end of the operation occur during this period. Then the profile of the appliance is updated.

---

Alg. 2-NILM Operation and Power Estimation of appliance j in House h at instant k

---

\# Inputs:
$\quad$ \# h,j,$P_{h,\{k_1-10...k_1-1\}}, R_{h,\{k_1-10...k_1-1\}}, \hat{P}_{h,j,\{k_1-10...k_1-1\}}$
\# Outputs
$\quad$ \# OP,$\hat{P}$
$\hat{P} = 0$
$OP = M_{h,j}^C(P_{h,\{k_1-10...k_1-1\}}, R_{h,\{k_1-10...k_1-1\}})$
if OP = 1
$\quad \hat{P} = M_{h,j}^E(P_{h,\{k_1-10...k_1-1\}}, R_{h,\{k_1-10...k_1-1\}}, \hat{P}_{h,j,\{k_1-10...k_1-1\}})$
end

---

For each appliance there are two models that intervene in the NILM operation: first a classifier model ($M_{i,j}^C$) which outputs 1 if the operation is working, and 0 if not. If it is working, then another estimation model is executed, to estimate the active power consumed.

---

Alg. 3-Updates the Profile of the $j^{th}$ MNC appliance of house h

---

\# Inputs
$\quad$ \# i, j, $StP_{h,j}$, $EndP_{h,j}$, $OP_{h,j,\{1...15\}}$, $\hat{P}_{h,j,\{1...15\}}$, k
\# Outputs
$\quad$ \# $\hat{P}_{h,j,\{k+1...k+PH\}}$
$k_1 = (k-1)*15+1$
[ $StP_{bef}$, $EndP_{bef}$, OP, P, P2]=LoadProfileMNC(h, j)
$\hat{P}_{h,j,\{k+1...k+PH\}} = 0$
If $\exists(OP_{h,j,\{\underline{k}...\bar{k}\}}) \neq 0$
$\quad$ Beg = 1
$\quad$ BegP = $StP_{h,j}-k_1+1$
$\quad$ StP = $StP_{h,j}$
$\quad$ If $StP_{h,j} = 0$
$\quad\quad$ Beg = $k_1 - StP_{bef}$
$\quad\quad$ BegP=1;
$\quad\quad$ StP = $StP_{bef}$
$\quad$ end -continued Alg. 3-Updates the Profile of the $j^{th}$ MNC appliance of house h LastP = 15
EndP = EndP$_{bef}$
If EndP$_{h,j} \neq 0$
    Last = EndP$_{h,j}$ −StP$_{bef}$
    LastP= EndP$_{h,j}$ −k$_1$
    EndP=EndP$_{h,j}$
end
OP$_{\{Beg...Last\}}$ = OP$_{\{Beg...Last\}}$ + OP$_{h,j,\{BetP...LastP\}}$
P$_{\{Beg...Last\}}$ = P$_{\{Beg...Last\}}$ + P$_{h,j,\{BetP...LastP\}}$
P2$_{\{Beg...Last\}}$ = P2$_{\{Beg...Last\}}$ + P$_{h,j,\{BetP...LastP\}}$^2
SaveProfileMNC(h, j, StP , EndP , OP , P, P2)
$\hat{P}_{h,j,\{k+1...k+m\}}$ ={mean(P$_{\{i...j\}}$./ OP$\{i...j\}$),l=1...m}
end For each appliance a profile is stored, with the start and end of the last (or current) operation of appliance j at house h, a vector (OP) describing the number of times where the appliance was on since its operation started, for each sample, a vector (P) storing the sum of the powers for each sample, and a vector (P2) storing the sum of the square of powers for each sample. All these variables assume a sampling interval of 1 sec.

Then, the mean power is simply obtained as P./O, where the symbol ".I" means division element-by-element. If necessary, the variance of the power can be obtained as P2./O-(P./O)^2.

The forecasting of the power over the prediction horizon, with a sampling interval of 15 minutes, is just obtained as the mean of the mean powers over each period of 15 minutes.

Forecasting of House h Manually Controlled Consumption Within the Prediction Horizon $$\hat{P}^{MC}_{h,\{k+1...k+PH\}} = \sum_{m=1}^{\#(\{MC_i\})} \hat{P}_{h,m,\{k+1...k+PH\}}$$

Typically, for this kind of appliances, the power is obtained from a vector of daily mean power values, which are obtained offline through measurements. This way, for each appliance, we use:

$$\hat{P}_{h,m,\{k+1...k+PH\}} = RetrieveProfileMC(i, j, k)$$

Alg. 4-Obtain the forecasting of the $j^{th}$ MC appliance of house h

\# Inputs:
  \# i, j, k
\# Outputs
  \# $\hat{P}_{h,j,\{k+1...k+PH\}}$
[P]=LoadProfileMC(h, j)
kbeg = dayindex(k)
$\hat{P}_{h,j,\{k+1\ k+PH\}}$ = [P$_{kbeg+1...96}$ P$_{1...kbeg}$]

Forecasting of House h Computer-Controlled Consumption Within the Prediction Horizon $$\hat{P}^{CC}_{h,\{k+1...k+PH\}} = \sum_{n=1}^{\#(\{CC_i\})} \hat{P}_{h,n,\{k+1...k+PH\}}$$

For this kind of appliances, the power can be obtained as for MC, or using other formulations, which are appliance specific.

$$\hat{P}_{h,m,\{k+1...k+PH\}} = RetrieveProfileCC(h, m, k)$$

9.2—Forecasting of PV Power generated (substep I2) (EXAMPLE)

Here we use also hybrid forecasting. The first 36 steps-ahead forecasting are obtained as:

$$PV_{h,\{k+1...k+36\}} = \{M^{PV}_h(\overline{PV}_{h,l}, \overline{T}_l, \overline{R}_l), l = k+1 \ldots k+36\} \quad (13)$$

Where R denotes global solar radiation. This way, we need an additional forecasting model to determine the forecasts of solar radiation over PH.

$$R_{\{k+1...k+36\}} = \{M^R(\overline{R}_l), l = k+1 \ldots k+36\} \quad (14)$$

10—MILP-MPC formulation (step m)

After having described a data acquisition system (140) according to the invention, it will now be described the software part that resides in the aggregator computational unit (110).

At every sampling instant k, the intelligent aggregator solves a Mixed-Integer Linear Programming (MILP) problem, formulated as:

$$\min \hat{C}^{Com} = \min \sum_{h=1}^{Nh}\sum_{s=1}^{PH} \left(\hat{P}^{Grid-}_{h,l} + \hat{P}^{Com-}_{h,l}\right)\pi^{Grid-}_l \Delta k - \quad (15)$$

$$\left(\hat{P}^{Grid+}_{h,l} + \hat{P}^{Com+}_{h,l}\right)\pi^{Grid+}_l \Delta k, l = k+s$$

In (15), Nh denotes the number of houses in the community, PH is the prediction horizon, and Δk is the sampling interval (in hours). Typical values for these two last parameters are 24 hours (96 steps) and ¼ hours, respectively. $\hat{P}^{Grid-}_{h,l}/\hat{P}^{Grid-}_{h,l}$ are the estimates (in Kw) of the active power bought(−)/sold(+) from/to the grid at the sampling instant/by house h. In the same way, $\hat{P}^{Com-}_{h,l}/\hat{P}^{Com+}_{h,l}$ are the estimates (in Kw) of the active power bought(−)/sold(+) from/to the community at the sampling instant/by house h. Finally, $\pi^{Grid-}_l/\pi^{Grid+}_l$ are the price, per kWh of the energy bought(−)/sold(+) from/to the community or the grid at the sampling instant I. This way, the estimate of the cost of the energy bought from the grid by the community during PH is minimized, while the estimate of the profit of the energy sold to the grid by the community during PH is maximized.

Notice that the receding horizon principle is used here. The solution of (15) is a sequence of control actions (the binary values described later) over the whole steps-ahead within PH. But only the first (one-step ahead) of these actions are applied at that instant of time. In the next instant of time the same process takes place.

There are several constraints that must be satisfied:

$$0 \leq \hat{P}_{h,l}^{Grid+} \leq \overline{P}_h^{Grid+}(1 - v_{h,l}^{Grid}) \quad (16)$$

$$0 \leq \hat{P}_{h,l}^{Grid-} \leq \overline{P}_h^{Grid-} v_{h,l}^{Grid} \quad (17)$$

In (16-17) it is defined that $\hat{P}_{h,l}^{Grid+}/\hat{P}_{h,l}^{Grid-}$ are positive variables with maximum value equal to the contracted power from the grid $\hat{P}_h^{Grid+}/\hat{P}_h^{Grid+}$ by house h. $v_{h,l}^{Grid}$ is the binary variable modelling the processes of selling/purchasing energy from house h to/from the grid, assuming value 1 if purchasing or 0 if selling.

$$0 \leq \hat{P}_{h,l}^{Com+} \leq \overline{P}_h^{Com+}(1 - v_{h,l}^{Com}) \quad (18)$$

$$0 \leq \hat{P}_{h,l}^{Com-} \leq \overline{P}_h^{Com-} v_{h,l}^{Com} \quad (19)$$

In the same way, $\hat{P}_{h,l}^{Com+}/\hat{P}_{Com-}$ are positive variables with maximum value equal to the maximum value exchangeable with the community $\overline{P}_h^{Com+}/\overline{P}_h^{Com-}$ by house h. $v_{h,l}^{Com}$ is the binary variable modelling the processes of selling/purchasing energy from house h to/from the community, assuming value 1 if selling or 0 if purchasing.

The energy balance can be given as:

$$\sum_{h=1}^{Nh} \hat{P}_{k,l}^{Com-} = \sum_{h=1}^{Nh} \hat{P}_{k,l}^{Com+} \quad (20)$$

It is not allowed to buy energy from the grid and sell energy to the community at the same time:

$$v_{h,l}^{Grid} + v_{h,l}^{Com} \leq 1 \quad (21)$$

10.1— Energy balance

Without Restrictions on the Transfer of Energy Within the Community

The energy balance of house h at instant k is:

$$\hat{P}_{h,l}^{PV} + \hat{P}_{h,l}^{B+} + \hat{P}_{h,l}^{Grid-} + \hat{P}_{h,l}^{Com-} = \quad (22)$$
$$\hat{P}_{h,l}^{B-} + \hat{P}_{h,l}^{Grid+} + \hat{P}_{h,l}^{NMC} + \hat{P}_{h,l}^{NC} + \hat{P}_{h,l}^{MC} + \hat{P}_{h,l}^{CC} + \hat{P}_{h,l}^{Com+}$$

In (22), $\hat{P}_{h,l}^{PV}$ is the estimate of the AC Power generated by the PV installation of house h at instant I.

The active power of house h, at instant k is composed of four terms:
a) related to devices (NMC) that are not monitored (NM) neither controlled (NC).
b) related to devices that are monitored (M) but not controlled (NC).
c) related to devices that are manually controlled (MC).
d) related to devices that are computer controlled (CC).

$$P_{h,k} = \quad (23)$$
$$\sum_{j=1}^{\#(\{NM_i\} \cup \{NC_i\})} P_{h,j,k} + \sum_{l=1}^{\#((M_i) \cap \{NC_i\})} P_{h,l,k} + \sum_{m=1}^{\#(\{MC_i\})} P_{h,m,k} + \sum_{n=1}^{\#(\{CC_i\})} P_{h,n,k} =$$
$$P_{h,k}^{NMC} + P_{h,k}^{NC} + P_{h,k}^{MC} + P_{h,k}^{CC}$$

Equation (22) is valid when it is possible to transfer energy between houses, without any restrictions. Several alternatives exist:

When There is No Transfer of Energy Between the Houses $$\hat{P}_{h,l}^{Com-} = \hat{P}_{h,l}^{Com+} = 0 \Rightarrow \quad (24)$$
$$\Rightarrow \hat{P}_{h,l}^{PV} + \hat{P}_{h,l}^{B+} + \hat{P}_{h,l}^{Grid-} = \hat{P}_{h,l}^{B-} + \hat{P}_{h,l}^{Grid+} + \hat{P}_{h,l}^{NMC} + \hat{P}_{h,l}^{NC} + \hat{P}_{h,l}^{MC} + \hat{P}_{h,l}^{CC}$$

In this case it is still possible to use the MILP-MPC formulation for each house individually.

Energy is Shared Between Houses, Using Energy Sharing Coefficients $$\hat{P}_{h,l}^{Com+} = \hat{P}_{h,l}^{PV} \Rightarrow \quad (25)$$
$$\Rightarrow \hat{P}_{h,l}^{B+} + \hat{P}_{h,l}^{Grid-} + \hat{P}_{h,l}^{Com-} = \hat{P}_{h,l}^{B-} + \hat{P}_{h,l}^{Grid+} + \hat{P}_{h,l}^{NMC} + \hat{P}_{h,l}^{NC} + \hat{P}_{h,l}^{MC} + \hat{P}_{h,l}^{CC}$$

$$\hat{P}_{h,l}^{Com-} = \beta_{h,l} \sum_{h=1}^{Nh} \hat{P}_{h,l}^{PV}, \quad (26)$$

$$\sum_{h=1}^{Nh} \beta_{h,l} = 1,$$

$$l = 1 \ldots PH$$

All PV power is shared by the community; its use for the individual houses is, however, governed by coefficients. In the case of fixed coefficients, the members of the community agree a certain fixed percentage of the total power of all PV systems to be allocated to each house. In the case of employing variable coefficients, the members agree that the optimal percentage of the total power of all PV systems to be allocated to house h is obtained through an optimization problem—here $\beta_{h,l}$ are variables to be optimized. The use of consumption-based coefficients the members agree that the percentage to be allocated to each house is calculated through the ratio between the consumption of the house and the total power consumption of all houses of the community. Finally, the use of a hybrid scheme implies that the members agree that the percentage to be allocated to house h is given by a hybrid coefficient that combines a predefined fixed coefficient and the percentage of the consumption relative to all houses of the community.

$$\beta_{h,l} = \begin{cases} FC_{h,l} \in [0,1]; \text{Fixed} \\ VC_{h,l} \in [0,1]; \text{Variable} \\ \dfrac{\hat{P}_{h,l}}{\sum_{l=1}^{Nh} \hat{P}_{h,l}}; \text{Consumption-based} \\ \dfrac{FC_{h,l}\hat{P}_{h,l}}{\sum_{l=1}^{Nh} FC_{h,l}\hat{P}_{h,l}}; \text{Hybrid} \end{cases} \quad (27)$$

The methodology of energy transfer between the members of community is defined by the community.

11—Examples of forecast of consumption for certain Computer Controlled devices: (step I4) calculation of forecasts of consumption)

Battery Bank

There is a series of restrictions related with the battery bank of house h at instant l:

$$0 \le \hat{P}_{k,l}^{B-} \le \overline{P}_h^{B-} v_{h,l}^B \quad (28)$$

$$0 \le \hat{P}_{k,l}^{B+} \le \overline{P}_h^{B+}(1 - v_{h,l}^B) \quad (29)$$

$$SoC_{h,l} = SoC_{h,l-1} + \dfrac{\eta_h^{B-}\hat{P}_{h,l}^{B-}}{\overline{E}_h^B}\Delta k - \dfrac{\hat{P}_{h,l}^{B+}}{\overline{E}_h^B \eta_h^{B+}}\Delta k \quad (30)$$

$$\underline{SoC_h} \le SoC_{h,l} \le \overline{SoC_h} \quad (31)$$

$$SoC_{h,0} = SoC_{h,initial} \quad (32)$$

$$v_{h,l}^B + v_{h,l}^{Grid} \le 1 \quad (33)$$

$$\hat{P}_{h,k}^{B+} - \hat{P}_{h,k-1}^{B+} \le RU_h \quad (34)$$

$$\hat{P}_{h,k}^{B-} - \hat{P}_{h,k-1}^{B-} \le RU_h \quad (35)$$

$$\hat{P}_{h,k-1}^{B+} - \hat{P}_{h,k}^{B+} \le RD_h \quad (36)$$

$$\hat{P}_{h,k-1}^{B-} - \hat{P}_{h,k}^{B-} \le RD_h \quad (37)$$

In (28-29) it is defined that $\hat{P}_{k,l}^{B-}/\hat{P}_{k,l}^{B+}$ are positive variables with maximum value equal to the maximum charge/discharge power $\overline{P}_h^{B-}/\overline{P}_h^{B+}$ of the battery bank of house h. $v_{h,l}^B$ is the binary variable modelling the processes of charge/discharge of battery bank of house h, assuming value 1 if charging or 0 if discharging. The minimum/maximum values of the state of charge of the battery bank, $\underline{SoC_h}/\overline{SoC_h}$ are defined in (31). The initial state of charge for each, $SoC_{h,initial}$ is defined in (32). In (33) it is stated that the binary variables $v_{h,l}^B$ and $v_{h,l}^{Grid}$ cannot assume the value 1 simultaneously, meaning that the battery cannot be charged directly with energy from the grid. To decrease the battery wear, in (34-35) maximum values of the ramp-up/ramp down rates RU/RD for charging or discharging of the battery bank are defined.

The update of state of charge of battery bank of house h is defined in (30). $\eta_h^{B-}/\eta_h^{B+}$ are the charging/discharging efficiency of the battery bank. $\overline{E}_h^B$ is the rated capacity of battery bank of house h.

Swimming Pool Pump

This is an example of a shiftable load, that must obey the following assumptions:

the pump must operate during a user-specified time (multiple of $T_s$) within one day—$N_{Tspp}$ it must remain on at least for a specified period of time (multiple of $\Delta k$)—$N_{mspp}$ The power consumption is constant and equal to the rated power—$\overline{P}_{i,spp}$ $$\sum_{j=k}^{k+N_{mspp}-1} v_{h,j}^{spp-on/off} \ge N_{Tspp} v_{h,k}^{spp-start} \quad (38)$$

$$P_{i,spp,k} = \overline{P}_{i,spp} v_{h,k}^{spp-on/off} \quad (39)$$

$$\sum_{j=1}^{K} P_{i,spp,j} = \overline{P}_{i,spp} N_{Tspp} \quad (40)$$

$$v_{h,k}^{spp-start} - v_{h,k}^{spp-shutdown} = v_{h,k}^{spp-on/off} - v_{h,k-1}^{spp-on/off} \quad (41)$$

$$v_{h,k}^{spp-start} + v_{h,k}^{spp-shutdown} \le 1 \quad (42)$$

Restriction (38) ensures that the pump must remain on for at least $N_{mspp}*T_s$. Restriction (39) says that the power consumption is equal to the pump rated power consumption. Restriction (40) states that the pump must operate $N_{Tspp}$ steps within a 24 hour period. Restriction (41) ensure the correct operation of the shiftable demand. Finally, (42) imposes that a start-up cannot occur at the same time of a shut-down. $v_{h,k}^{spp-on/off}$, $v_{h,k}^{spp-start}$ and $v_{h,k}^{spp-shutdown}$ are the binary variables for the state on/off, for the start-up and the shut-down binary variable of the swimming pool pump of house h.

Air Conditioner

It is assumed that the air-conditioner must ensure thermal comfort in a room between user-specified periods of time, or schedules. Assume that one of these periods is $[t_s, t_e]$, which corresponds to the sample range $[k_s, k_e]$. The reference temperature (a discrete, integer value) to apply to AC is given as the solution of the following Model Predictive Control (MPC) problem:

$$(t < t_s) \wedge (t > t_s - \Delta t) \min_{U[k] \in v_{PH}}\left(\sum_{i=k+1}^{k_s} J[i]\right)\bigg|_{U[k]} + \min_{U[k] \in v_{PH}}\left(\sum_{i=k_s+1}^{k+PH} J[i]\right)\bigg|_{U[k]} \quad (43)$$
$$s.t. |\Theta[i]| < \Theta_T, i=1:PH$$

$$t+PH > t_e \quad \min_{U[k] \in v_{PH}}\left(\sum_{i=k+1}^{k_e} J[i]\right)\bigg|_{U[k]}$$
$$s.t. |\Theta[i]| < \Theta_T, i=1:PH$$

$$\text{others} \quad \min_{U[k] \in v_{PH}}\left(\sum_{i=k+1}^{k+PH} J[i]\right)\bigg|_{U[k]}$$
$$s.t. |\Theta[i]| < \Theta_T, i=1:PH$$

In (43), the solution is divided into 3 alternatives, depending on the instant of time considered: a) if it is before the start of the period, we only need to ensure that the room is in thermal comfort when, within the prediction horizon (PH), the time considered is after $t_s$; b) near the end of the period, we do not need to ensure thermal comfort when time is larger than after $t_e$; c) all the other cases we determine the optimal sequence of actions, between the admissible sequence of actions ($v_{PH}$) throughout PH. J[i] is the cost function at step i, whose profile must be supplied to the system. The thermal comfort ($\Theta$) uses the Predicted Mean Vote (PMV) formulation, and $\Theta_T$ is a threshold, typically assuming the value of 0.5. To compute $\Theta_k$ for a room, the following information is needed: Air temperature ($IT_{h,k}^{room}$), Relative humidity ($RH_{h,k}^{room}$) and Wall temperature ($WT_{h,k}^{room}$). Further details can be found in [5]. $\Delta t$, the time before the start of the schedule when the AC might need to operate to ensure thermal comfort throughout the whole period, must be specified.

With this explanation, the incorporation of the automatic control of an AC is given by the following equation:

$$P_{h,AC,k} = \hat{J}_{h,AC,k} v_{h,k}^{AC-on/off} \quad (44)$$

In (44), $\hat{J}_{H,AC,k}$ denotes the estimated cost of controlling the air conditioner AC of house i at step k and $v_{h,k}^{AC-on/off}$ is the binary variable controlling the operation of AC during $[t_s\text{-}\Delta t, t_e]$.

Design of Classification or Forecasting Models (EXAMPLE)

Hereinafter it is described how good models can be obtained from a set of acquired or existent data.

Three sub-problems must be solved:
a) A pre-processing stage where, from the existing data, suitable sets (training, testing, validation, etc.) are obtained; this is known as a data selection problem;
b) Determine the "best" set of inputs (feature/delays selection) and network topology, given the above data sets;
c) Determine the "best" network parameters, given the data sets, inputs/delays and network topology These sub-problems are solved by the application of a model design framework, composed of two tools. The first, denoted as ApproxHull, performs data selection, from the data available for design. Feature and topology search are solved by the evolutionary part of MOGA (Multi-Objective Genetic Algorithm), while parameter estimation is performed by the gradient part of MOGA.

ApproxHull

To design data driven models like RBFs (Radial Basis Functions), it is mandatory that the training set involves the samples that enclose the whole input-output range where the underlying process is supposed to operate. To determine such samples, called convex hull (CH) points, out of the whole dataset, convex hull algorithms can be applied.

The standard convex hull algorithms suffer from both exaggerated time and space complexity for high dimensions studies. To tackle these challenges in high dimensions, ApproxHull was proposed in [3] as a randomized approximation convex hull algorithm. To identify the convex hull points, ApproxHull employs two main computational geometry concepts: the hyperplane distance and the convex hull distance.

Given the point $x = [x_1 \ldots x_d]^T$ in a d-dimensional Euclidean space, and an hyperplane H, the hyperplane distance of x to H is obtained by:

$$ds(x, H) = \frac{a_1 x_1 + \cdots + a_d v_d + b}{\sqrt{a_1^2 + \cdots a_d^n}} \quad (45)$$

where $n = [a_1, \ldots a_d]^T$ and d are the normal vector and the offset of H, respectively.

Given a set $X = \{x_i\}_{i=1}^n \subset \Re^d$ and a point $x \in \Re^d$, the Euclidean distance between x and the convex hull of X, denoted by conv(X), can be computed by solving the following quadratic optimization problem:

$$\min_a \left( \frac{a^T Q a}{2} - c^T a \right) \quad (46)$$

$$\text{s.t. } e^T a = 1,$$

$$a \geq 0$$

where $e = [1, \ldots 1]^T$, $Q = X^T X$ and $c = X^T x$. Assuming that the optimal solution of (46) is $a^*$, the distance of point x to conv(X) is given by:

$$dc(x, conv(X)) = \sqrt{x^T x - 2c^T a^* + a^{*T} Q a^*} \quad (47)$$

ApproxHull consists of five main steps. In Step 1, each dimension of the input dataset is scaled to the range [−1, 1]. In Step 2, the maximum and minimum samples with respect to each dimension are identified and considered as the vertices of the initial convex hull. In Step 3, a population of k facets based on the current vertices of the convex hull is generated. In Step 4, the furthest points to each facet in the current population are identified using (45) and they are considered as the new vertices of the convex hull, if they have not been detected before. Finally, in Step 5, the current convex hull is updated by adding the newly found vertices into the current set of vertices. Step 3 to Step 5 are executed iteratively until no vertex found in Step 4 or the newly found vertices are very close to the current convex hull, thus not containing useful information. The closest points to the current convex hull are identified using the convex hull distance under an acceptable user-defined threshold.

Figure 6:
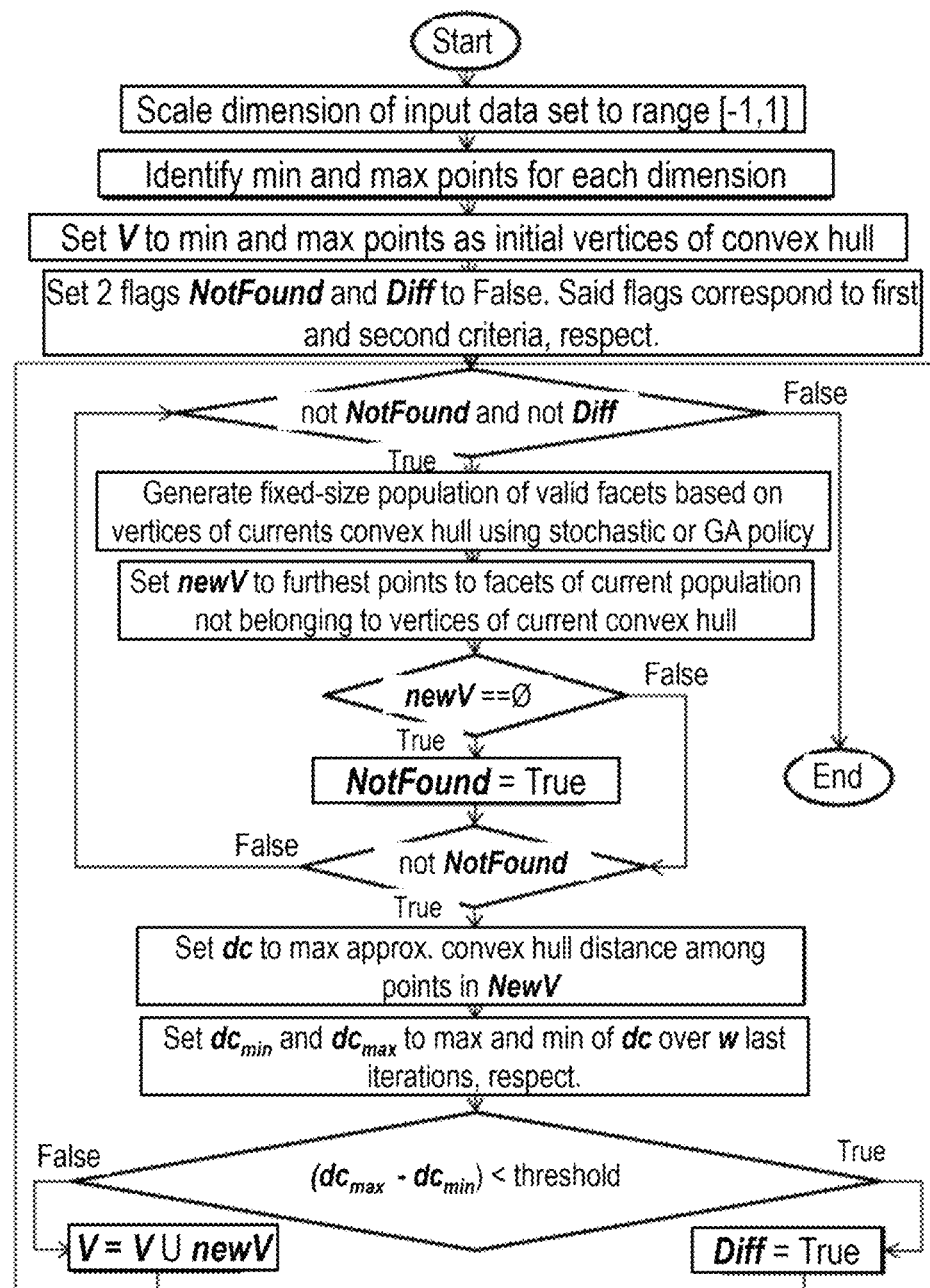
FIG. 6—illustrates a flowchart of a ApproxHull used in embodiments of the present invention.

The flowchart of AproxHull is shown in FIG. 6.

In a prior step before determining the CH points, ApproHull eliminates replicas and linear combinations of samples/features. After having identified the CH points, ApproxHull generates the training, test and validation sets to be used by MOGA, according to user-specifications, but incorporating the CH points in the training set.

MOGA

This framework is described in detail in [6], and it will be briefly discussed here.

MOGA designs static or dynamic ANN (Artificial Neural Network) models, for classification, approximation or forecasting purposes.

Parameter Separability

MOGA employs models that are linear-nonlinearly separable in the parameters. The output of this type of models, at time step k, is given as:

$$\hat{y}(x_k, w) = u_0 + \sum_{i=1}^{n} u_i \varphi_i(x_k, v_i) = \varphi(x_k, v) u \quad (48)$$

In (48), $x_k$ is the ANN input at time step k, $\varphi$ is the basis functions vector, u is the (linear) output weights vector and v represents the nonlinear parameters. For simplicity, we shall assume here only one hidden layer, and v is composed of n vectors of parameters, each one for each neuron ($v=[v_1 \ldots v_n]^T$). This type of models comprises Multilayer Perceptrons, Radial Basis Function (RBF) networks, B-Spline and Asmod models, Wavelet networks, and Mamdani, Takagi and Takagi-Sugeno fuzzy models (satisfying certain assumptions).

This means that the model parameters can be divided into linear and nonlinear parameters:

$$w = \begin{bmatrix} u \\ v \end{bmatrix} \quad (49)$$

and that this separability can be exploited in the training algorithms. For a set of input patterns X, training the model means finding the values of w, such that the following criterion is minimized:

$$\Omega(X, w) = \frac{\|y - \hat{y}(X, w)\|_2^2}{2} \quad (50)$$

where $\|\cdot\|_2$ denotes the Euclidean norm. Replacing (49) in (50), we have:

$$\Omega(X, w) = \frac{\|y - \Gamma(X, v)u\|_2^2}{2} \quad (51)$$

where $\Gamma(X, v) = [\varphi(x_1, v) \ldots \varphi(x_m, v)]^T$, m being the number of patterns in the training set. As (51) is a linear problem in u, its optimal solution is given as:

$$u* = \Gamma^+(X, v)y \quad (52)$$

Where the symbol '+' denotes a pseudo-inverse operation. Replacing (52) in (51), we have a new criterion, that is only dependent on the nonlinear parameters:

$$\Psi(X, v) = \frac{\|y - \Gamma(X, v)\Gamma^+(X, v)y\|_2^2}{2} \quad (53)$$

The advantages of using (53) instead of (51) are threefold:
It lowers the problem dimensionality, as the number of model parameters to determine is reduced;
The initial value of (53) is much smaller than (51);
Typically, the rate of convergence of gradient algorithms using (53) is faster than using (51).

Training Algorithm

Any gradient algorithm can be used to minimize (53) or (51). First-order algorithms, error back-propagation (or steepest descent method), conjugate-gradient method, or their variants, or second-order methods, such as quasi-Newton, Gauss-Newton or Levenberg-Marquardt (LM) algorithms can be employed. For non-linear least-squares problems, the LM method is recognized to be the state-of-the-art method, as it exploits the sum-of-squares characteristics of the problem. The LM search direction is given as the solution of:

$$(J_k^T J_k + \lambda_k I) p_k = -g_k \quad (54)$$

Where $g_k$ is the gradient vector:

$$g_k = \frac{\delta \Omega_k}{\delta w_k} \text{ or } \frac{\delta \Psi_k}{\delta v_k} \quad (55)$$

And $J_k$ is the Jacobean matrix:

$$J_k = \frac{\delta \hat{y}_k}{\delta w_k} \text{ or } \frac{\delta \hat{y}_k}{\delta v_k} \quad (56)$$

$\lambda$ is a regularization parameter, which enables the search direction to change between the steepest descent and the Gauss-Newton directions.

It has been proved that the gradient and Jacobean of criterion (53) can be obtained by: a) first computing (52); b) replacing the optimal values in the linear parameters; c) and determining the gradient and Jacobian in the usual way.

In MOGA, the training algorithm terminates after a pre-defined number of iterations or using an early-stopping technique.

Radial Basis Function Networks

In the case described here, RBF models will be employed. The basis functions employed by RBFs are typically Gaussian functions:

$$\varphi_i(x_k, v_i) = e^{-\frac{\|x_k - c_i\|_2^2}{2\sigma_i^2}} \quad (57)$$

Which means that the nonlinear parameters for each neuron are constituted by a centre vector, $c_i$, with as many components as the dimensions of the input, and a spread parameter, $\sigma_i$. The derivatives of the basis function with respect to the nonlinear parameters are:

$$\frac{\partial \varphi_i(x_k)}{\partial c_{i,j}} = \varphi_i(x_k) \frac{x_{k,j} - c_{i,j}}{\sigma_i^2} \quad (58)$$

$$\frac{\partial \varphi_i(x_k)}{\partial \sigma_i} = \varphi_i(x_k) \frac{\|x_k - c_i\|_2^2}{\sigma_i^3} \quad (59)$$

Associated with each model, there are always heuristics that can be used to obtain the initial values of the parameters. For RBBs, centre values can be obtained randomly from the input data, or from the range of the input data. Alternatively, clustering algorithms can be employed. Initial spreads can be chosen randomly, or using several heuristics, such as:

$$\sigma = \frac{z_{max}}{\sqrt{2b}} \quad (60)$$

where $z_{max}$ represents the maximum distance between centres.

The Evolutionary Part

MOGA evolves ANN structures, whose parameters separate (in this case RBFs), each structure being trained by the algorithm described before. The text below is for the design of forecasting models; for classifiers we shall describe the changes in the end of the section.

As we shall be designing forecasting models, where we want to predict the evolution of a specific variable within a predefined PH (Prediction Horizon), the models should provide multi-step-ahead forecasting. This type of forecasts can be achieved in a direct mode, by having several one-step-ahead forecasting models, each providing the prediction of each-step ahead within a PH. An alternative, which is the one followed in this work, is to use a recursive version. In this case, only one model is used, but its inputs evolve with time. Consider the Nonlinear Auto-Regressive model with Exogeneous inputs (NARX), with just one input, for simplicity:

$$\hat{y}_{k+1|k} = f(z_k) = f(y_{k-d_{0_1}}, \ldots, y_{k-d_{0_n}}, x_{k-d_{i_1}}, \ldots, x_{k-d_{i_m}}) \quad (61)$$

Where $\hat{y}_{k+1|k}$ denotes the prediction for time-step k+1 given the measured data at time k, and $d_{i_j}$ the/h delay for variable i. This represents the 1-step-ahead prediction within a prediction horizon. As we iterate (61) over PH, some or all of the indices in the right hand-side will be larger than k, which means that the corresponding forecast must be employed. What has been said for NARX models is also valid for NAR models (with no exogeneous inputs).

Figure 7:
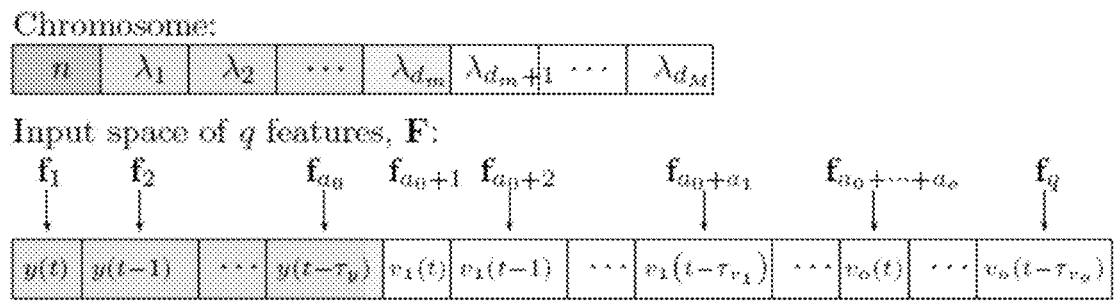
FIG. 7—illustrates a chromosome and input space lookup table of a neural network used in embodiments of the present invention.

The evolutionary part of MOGA evolves a population of ANN structures. Each topology comprises of the number of neurons in the single hidden layer (for an RBF model), and the model inputs or features. MOGA assumes that the number of neurons must be within user-specified bound, $n \in [n_m, n_M]$. Additionally, one needs to select the features to use for a specific model, i.e, must perform input selection. In MOGA we assume that, from a total number q of available features, denoted as F, each model must select the most representative d features within a user-specified interval, $d \in [d_m, d_M]$, $d_M \leq q$. For this reason, each ANN structure is codified as shown in FIG. 7. In that figure, C denotes a chromosome and F the input space.

The first component corresponds to the number of neurons. The next $d_m$ represents the minimum number of features, while the last white ones are a variable number of inputs, up to the predefined maximum number. The $\lambda_j$ values correspond to the indices of the features $f_j$ in the columns of F.

Figure 8:
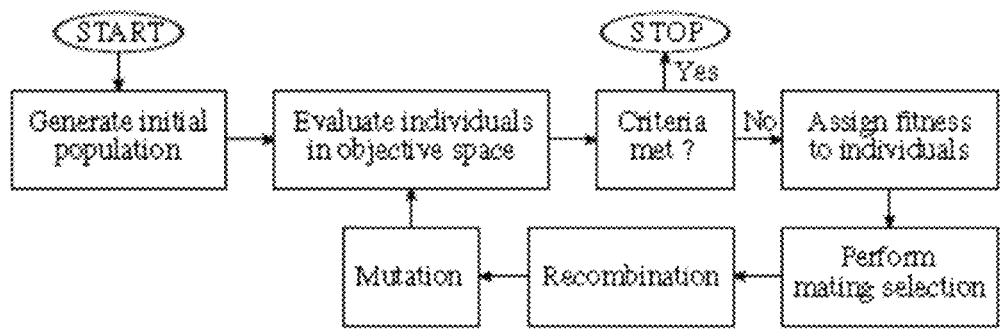
FIG. 8—illustrates a MOGA flow of operation of a neural network used in embodiments of the present invention.

The operation of MOGA is a typical evolutionary procedure, represented in FIG. 8.

We shall refer the reader to publication [6] regarding genetic operators.

Figure 9:
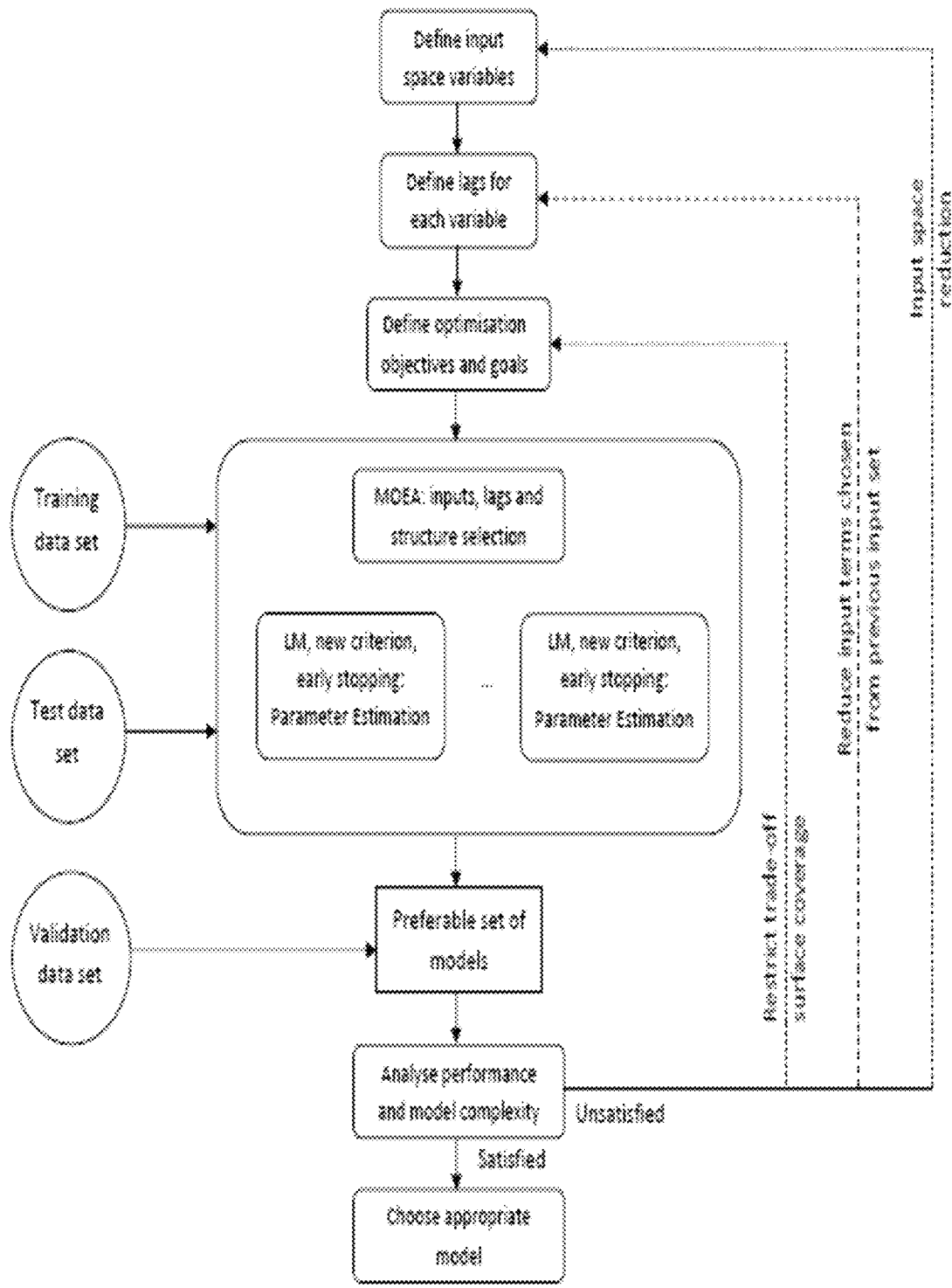
FIG. 9—illustrates a model design cycle used in embodiments of the present invention.

The model design cycle is illustrated in FIG. 9.

First, the search space should be defined. That includes the input variables to be considered, the lags to be considered for each variable, and the admissible range of neurons and inputs. The total input data, denoted as F, together with the target data, must then be partitioned into three different sets: training set, to estimate the model parameters, test set, to perform early-stopping, and validation set, to analyze the MOGA performance.

Secondly, the optimization objectives and goals need to be defined. Typical objectives are Root-Mean-Square Errors (RMSE) evaluated on the training set ($\rho_{tr}$), or on the test set ($\rho_{te}$), as well as the model complexity, #(v)—number of nonlinear parameters—or the norm of the linear parameters ($\|u\|_2$). For forecasting applications, as it is the case here, one criterion is also used to assess its performance. Assuming a time-series sim, a subset of the design data, with p data points. For each point, the model (61) is used to make predictions up to PH steps-ahead. Then an error matrix is built:

$$E(sim, PH) = \begin{bmatrix} e[1,1] & e[1,2] & \ldots & e[1, PH] \\ e[2,1] & e[2,2] & \ldots & e[2, PH] \\ \vdots & \vdots & \ddots & \vdots \\ e[p-\text{ph}, 1] & e[p-\text{ph}, 2] & \ldots & e[p-\text{ph}, PH] \end{bmatrix} \quad (62)$$

where e[i,j] is the model forecasting error taken from instant i of sim, at step j within the prediction horizon. Denoting the RMS function operating over the $i^{th}$ column of matrix E, by $\rho_{sim}(.,i)$, the forecasting performance criterion is the sum of the RMS of the columns of E:

$$\rho_{sim}(PH) = \sum_{i=1}^{PH} \rho(E(sim, PH), i) \quad (63)$$

One should notice that every performance criterion can be minimized, or set as a restriction, in the MOGA formulation.

After having formulated the optimization problem, and after setting other hyperparameters, such as the number of elements in the population ($n_{pop}$), number of iterations population ($n_{iter}$), and genetic algorithm parameters (proportion of random immigrants, selective pressure, crossover rate and survival rate), the hybrid evolutive-gradient method is executed.

Each element in the population corresponds to a certain RBF structure. As the model is nonlinear, a gradient algorithm such as the LM algorithm minimizing (53) is only guaranteed to converge to a local minimum. For this reason, the RBF model is trained a user-specified number of times, starting with different initial values for the nonlinear parameters. MOGA allows initial centers to be chosen from the heuristics, or using an adaptive clustering algorithm.

Figure 10:
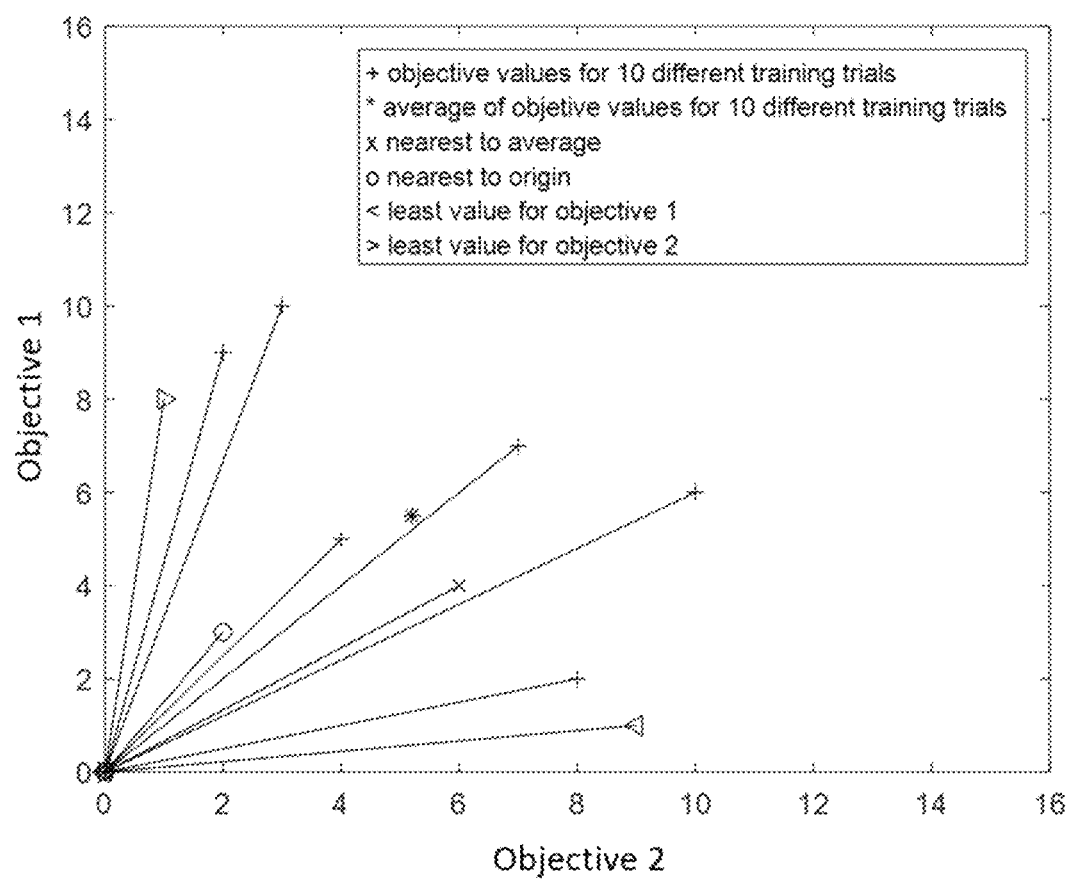
FIG. 10—illustrates a chart plotting different strategies for identifying the best out of 10 training trials of a neural network used in embodiments of the present invention.

As the problem is multi-objective, there are several ways for identifying which training trial is the best one. One strategy is to select the training trial whose Euclidean distance from the origin is the smallest. Symbol "o" in FIG. 10 illustrates this situation for d=2. In the second strategy, the average of objective values for all training trails is calculated and then the trial whose value is the closest to the average value will be selected as the best one (i.e., symbol "x"—or nearest to average, in FIG. 10).

The other d strategies are to select the training trial which minimized the $i^{th}$ objective (i.e., i=1, 2, . . . , d) better than the other trials. As an example, the symbols '<'e'>' in FIG. 10 are the best training trials which minimized objective 1 and objective 2, respectively.

Figure 11:
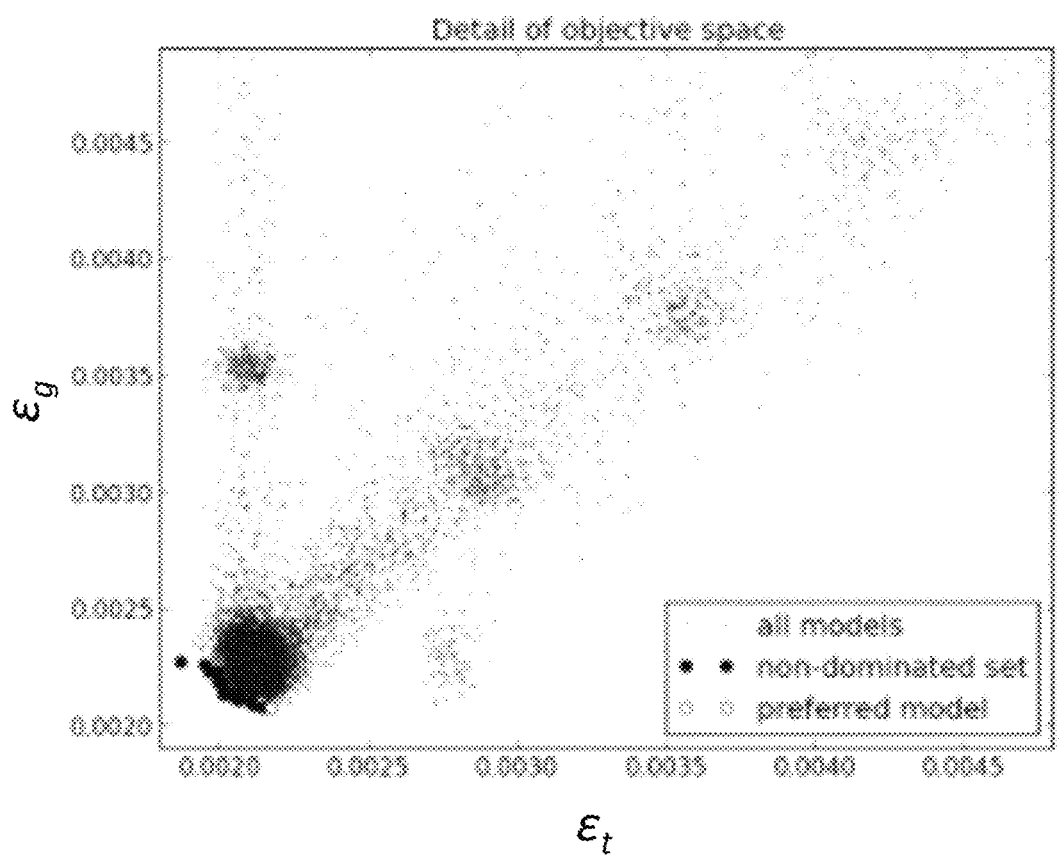
FIG. 11—illustrates a chart Detail of objective space for a problem of a model used in embodiments of the present invention.

After having executed the specified number of iterations, we have performance values of $n_{pop}*n_{iter}$ different models. As the problem is multi-objective, a subset of these models corresponds to non-dominated models (nd), or Pareto solutions. If one or more objectives is (are) set as restriction(s), a subset of nd, denoted as preferential solutions, pref, corresponds to the non-dominated solutions, which meet the goals. An example is shown in FIG. 11, wherein the small dots represent all models, the larger dots in black represent non-dominated solutions and the large dot in white represents the chosen solution. In the graph shown in FIG. 11, $\varepsilon_t$ represents an objective defined as the root mean square error obtained in the training set and $\varepsilon_g$ represents an objective defined as the root mean square error obtained in the generalization training data set.

The performance of MOGA models is assessed on the non-dominated models set, or in the preferential models set. If a single solution is sought, it will be chosen on the basis of the objective values of those model sets, performance criteria applied to the validation set, and possibly other criteria.

When the analysis of the solutions provided by the MOGA requires the process to be repeated, the problem definition steps should be revised. In this case, two major actions can be carried out: input space redefinition by removing or adding one or more features (variables and lagged input terms in the case of modelling problems) and improving the trade-off surface coverage by changing objectives or redefining goals. This process may be advantageous as usually the output of one run allows reducing the number of input terms (and possibly variables for modelling problems) by eliminating those not present in the resulting population. Also, it usually becomes possible to narrow the range for the number of neurons in face of the results obtained in one run. This results in a smaller search space in a subsequent run of the MOGA, possibly achieving a faster convergence and better approximation of the Pareto front.

Typically, for a specific problem, an initial MOGA execution is performed, minimizing all objectives. Then a second execution is run, where typically some objectives are set as restrictions.

Robust Model Ensemble

In the end of the $2^{nd}$ MOGA execution, we obtain a set of preferential models. A sub-set of those, denoted as outset, will be selected using the procedure described below, and the model output, for a forecasting application, will be given as:

$$\tilde{y}(\cdot) = \text{median}(\{\hat{y}_i(\cdot), i \in \text{outset}\}) \quad (64)$$

For a classification application, the output is given as:

$$\tilde{y}(\cdot) = \text{majority\_vote}(\{\text{step}(\hat{y}_i(\cdot)), i \in \text{outset}\}) \quad (65)$$

Where the step function is given as:

$$\text{step}(x) = \begin{cases} 1, & x \geq 0 \\ -1, & x < 0 \end{cases} \quad (66)$$

In certain embodiments of a first aspect, the invention relates to a computer implemented method for community energy management (1000), comprising the following steps:
a) acquisition, by an aggregator computational unit (110), of data $d_0$ that will be used for designing prediction models and appliance profiles, during a period of time, preferably during at least one month;
b) design, using a cloud-based server (115) of Radial Basis Function prediction models to use for predicting selected from the group consisting of: global solar radiation and atmospheric air temperature of the community, power consumption and power generation in each house h of the community, as well as operation and power consumption for all monitored appliances by Non-Invasive Load Monitoring models, wherein said design comprises the following substeps:
  b1) selection of the data available for design from the data $d_0$ acquired in step a);
  b2) minimization of the model objectives through a Multi-Objective Genetic Algorithm;
  b3) analysis of the results of the first design, restricting some of the objectives minimized in step b2) and redefinition of the input space and/or the model topology;
  b4) utilization of the preferential set of models obtained from a second Multi-Objective Genetic Algorithm execution;
  b5) determination of a second set of the preferred models $m_e^{pref}$ obtained in the previous substep through the following equation:

$$m_e^{pref} = \left\{ m_{pref} : nw(m_{pref}) \leq \tilde{m}_{nw}^{pref} \right\} \bigcap \left\{ m_{pref} : fore(m_{pref}) \leq \tilde{m}_{fore}^{pref} \right\}$$

wherein $m_{pref}$ is the set of preferred models obtained in the second Multi-Objective Genetic Algorithm execution, $\tilde{m}_{nw}^{pref}$ is the median of the linear weight norm for each model in $m_{pref}$ and $\tilde{m}_{fore}^{pref}$ the median of the sum of the forecasts for the prediction time-series obtained by models $m_{pref}$;
  b6) obtaining of a third set of models, $m_e^{par}$ from the previous step by using the following equation:

$$m_e^{par} = \left\{ nd\left(fore\left(m_e^{pref}\right), nw\left(m_e^{pref}\right)\right) : \#nd = NS \right\},$$

wherein nd(.) stands for non-dominated solutions and NS is its number, preferably NS=25;
  b7) if the model that should be designed is a Nonlinear Auto-Regressive model with Exogeneous inputs, usage, by the server of $m_e^{par}$ for the exogenous variables;
c) determination of the power profiles for all monitored, manually controlled and computer-controlled appliances in the community, by the cloud-based server (115);
d) reception, by the aggregator computational unit (110), of all models designed in b), all power profiles determined in c), initial values $v_0$ and initial control actions, through a user-interface, as well as data history for all models supplied by a data acquisition subsystem (140) installed in each house h, one or more consumption energy meters (130) installed in at least one house h, one or more inverter energy meters (160) installed in at least one house h, one or more sensors (150) installed in at least one house h;
e) reception, by a data acquisition subsystem (140), of data related to house h, wherein said data is sent wirelessly and/or wired and wherein said reception includes the following substeps:
  e1) reception of electric consumption data $d^1$ sent by a consumption energy meter (130) installed at each house h, wherein data $d_1$ comprise active power being consumed in house h at all instants $k_1$ within the sampling interval $\Delta k$, $P_{h,k_1}$, and reactive power being consumed in house h at all instants $k_1$ within the sampling interval $\Delta k$, $R_{h,k_1}$;

e2) reception of data $d_2$ related to at least one energy producing photovoltaic subsystem installed in at least one house h, sent by an inverter energy meter (160) wherein data $d_2$ comprise the power generated by at least one energy producing photovoltaic subsystem of house h at an instant k, $P_{h,k}^{PV}$; the power imported from the grid $P_{h,k}^{Grid-}$, and the power exported to the grid $P_{h,k}^{Grid+}$, wherein PV refers to photovoltaic;

e3) reception of data $d_3$ related to at least one battery bank installed in at least one house h, sent by an inverter energy meter (160) wherein data $d_3$ comprises at least the state of charge of the battery;

f) sending of the control actions determined in the previous step, by the aggregator computational unit (110) to each data acquisition subsystem (140), which, on its turn, sends the respective control actions to the computer-controlled devices in each house of the community;

g) reception, by an aggregator computational unit (110), of the data $d_1$, $d_2$ and $d_3$ related to house h at an instant k, sent by the data acquisition subsystem (140);

h) reception, by the aggregator computational unit (110), of weather data $d_4$, related to the community, wherein said weather data $d_4$ comprises air temperature data and global solar radiation data;

i) reception of tariff-related data $d^5$ of each house h in the community, wherein said data $d_5$ is retrieved from a database (125) by the aggregator computational unit (110);

j) reception, by the aggregator computational unit (110), of occupation-related data $d_6$ of each house h, inserted in a database by each user via a user interface (145);

k) determination of the averaged active power consumption of each house:

$$P_{n,k} = \frac{P_{h,k_1}}{N}, N = \frac{\Delta k}{k_1};$$

l) calculation of forecasts for a user-specified Prediction Horizon PH of both the energy consumption of each individual house h and the energy generation of each energy producing photovoltaic apparatus in the community over the prediction horizon, by using one or more of the methods of the group consisting of naive forecasting methods, multi-step Nonlinear Auto-Regressive Exogenous forecasting models, AutoRegressive Integrated Moving Average, ARIMA, Classification and Regression Trees, CART, Wavelet, Fuzzy or Neuro-Fuzzy models, and an hybrid combination thereof; wherein the present calculation step comprises the following substeps:

I1) calculation of forecasts of consumption for the devices in each house that are not monitored and not controlled NMC, which is given as the sum of the active power of corresponding appliances in each house, given by:

$$\hat{P}_{h,\{k+1 \ldots k+PH\}}^{NMC} = \sum_{j=1}^{\#(\{NM_i\}\cup\{NC_i\})} \hat{P}_{h,j,\{k+1 \ldots k+PH\}}; \quad (I)$$

devices in each house h that are not monitored but not controlled NMC by means of:

$$\hat{P}_{h,\{k+1 \ldots k+PH\}}^{NMC} = \hat{P}_{h,\{k+1 \ldots k+PH_{NARX}\}}^{NMC} \cup \hat{P}_{h,\{k+PH_{NARX}+1 \ldots k+PH\}}^{NMC} \quad (II)$$

wherein the first term in the right-hand-side of (II) refers to the use of the Nonlinear Auto-Regressive model with Exogeneous NARX model and the second term to the naïve forecast technique;

wherein $PH_{NARX}$ denotes the first steps within PH whose forecasts are obtained as the median of the outputs of the models $m_e^{pref}$:

$$\hat{P}_{h,\{k+1 \ldots k+PH_{NARX}\}}^{NMC} = \quad (III)$$
$$\{M_h^P(\overline{P}_{h,l}^{NMC}, \overline{T}_l, O_{h,l}, D_l), l = k+1 \ldots k+PH_{NARX}\};$$

wherein the second term is given as:

$$\hat{P}_{h,\{k+PH_{NARX}+1 \ldots k+PH\}}^{NMC} = P_{h,\{k+PH_{NARX}+1-\frac{24}{\Delta k} \ldots k+PH-\frac{24}{\Delta k}\}}^{NMC}, \quad (IV)$$

i.e., the value obtained one day ago;

wherein $\overline{P}_{h,l}^{NMC}$ denotes a set of past values relative to l of $P_{h,l}^{NMC}$, $\overline{T}_l$ denotes a set of past values relative to l of $T_l$, $O_{h,l}$ denotes the daily occupation relative to instant/of house h, and $D_l$ corresponds to a codification of the day, within the week:

wherein as the multi-step iteration of (III) involves predictions of the atmospheric temperature, these forecasts will be given as a multi-step iteration of a NAR model:

$$\hat{T}_{\{k+1 \ldots k+PH_{NARX}\}} = \{M^T(\overline{T}_l), l = k+1 \ldots k+PH_{NARX}\}; \quad (V)$$

12) calculation of forecasts of consumption for the devices in each house that are monitored but not controlled NC, which is given as the sum of the active power of corresponding appliances in each house, given by:

$$\hat{P}_{h,\{k+1 \ldots k+PH\}}^{NC} = \sum_{j=1}^{\#(\{M_i\}\cap\{NC_i\})} \hat{P}_{h,j,\{k+1 \ldots k+PH\}}; \quad (VI)$$

wherein the forecasts of consumption of each device, $\hat{P}_{h,j,\{k+1 \ldots k+PH\}}$, are given by the joint application of Non-Invasive Load Monitoring NILM classification models configured to determine if the appliance is operating or is off for every instant in PH and, if the appliance is on, the estimate of consumption given by the NILM forecasting model, and the power profile of the appliance, determined offline and updated on-line;

13) calculation of forecasts of consumption for the devices in each house that are manually controlled MC, which is given as the sum of the active power of corresponding appliances in each house, given by:

$$\hat{P}^{MC}_{h,\{k+1\ \ldots\ k+PH\}} = \sum_{m=1}^{\#(\{MC_i\})} \hat{P}_{h,j,\{k+1\ \ldots\ k+PH\}}; \quad \text{(VII)}$$

wherein the forecasts of consumption of each device $$\sum_{m=1}^{\#(\{MC_i\})} \hat{P}_{h,m,\{k+1\ \ldots\ k+PH\}}$$

are obtained using the power profiles determined off-line;

14) calculation of forecasts of consumption for the devices in each house that are computer controlled CC, which is given as the sum of the active power of corresponding appliances in each house, given by:

$$\hat{P}^{CC}_{h,\{k+1\ \ldots\ k+PH\}} = \sum_{n=1}^{\#(\{CC_i\})} \hat{P}_{h,n,\{k+1\ \ldots\ k+PH\}}; \quad \text{(VIII)}$$

wherein the operation of each appliance is given as the solution of the Mixed-Integer Linear Programming MILP problem carried out in step m), and whose consumption estimation can be given using the power profiles determined off-line;

15) calculation of forecasts of photovoltaic power generation by means of a combination of the naive forecasting method and multi-step Nonlinear Auto-Regressive Exogenous NARX forecasting models for each energy generation photovoltaic subsystem in each house h comprising an energy generation photovoltaic subsystem; the NARX forecasts are given by:

$$PV_{h,\{k+1\ \ldots\ k+PH_{NARX}\}} = \quad \text{(IX)}$$
$$\{M^{PV}_h(\overline{PV}_{h,l}, T_l, R_l), l = k+1\ \ldots\ k+PH_{NARX}\};$$

wherein R denotes global solar radiation,
wherein an additional forecasting model is needed for solar radiation over PH, to determine its evolution is used:

$$R_{\{k+1\ \ldots\ k+36\}} = M^R(\overline{R}_l), l = k+1\ \ldots\ k+36\} \quad \text{(X)}$$

m) formulation, by the aggregator computational unit (110), of a Mixed-Integer Linear Programming problem as indicated in formula (XI) below $$\min \hat{C}^{Com} = \min \sum_{h=1}^{Nh} \sum_{s=1}^{PH} \left(\hat{P}^{Grid-}_{h,l} + \hat{P}^{Com-}_{h,l}\right)\pi^{Grid-}_l \Delta k - \quad \text{(XI)}$$
$$\left(\hat{P}^{Grid+}_{h,l} + \hat{P}^{Com+}_{h,l}\right)\pi^{Grid+}_l \Delta k, l = k+s$$

wherein
Nh denotes the number of houses in the community;
PH is a prediction horizon, and
$\Delta k$ is the sampling interval;

$\hat{P}_{h,l}^{Grid-}/\hat{P}_{h,l}^{Grid+}$ are estimates of the active power P bought-/sold+ from/to an electrical energy grid at a sampling instant/by house h in the community;
$\hat{P}_{h,l}^{Com-}/\hat{P}_{h,l}^{Com+}$ are estimates of the active power P bought-/sold+ from/to the community at the sampling instant/by house h;
$\pi_l^{Grid-}/\pi_l^{Grid+}$ are the price of the energy bought-/sold+ from/to the community or the electrical energy grid at the sampling instant I;
wherein the following constraints (XII) and (XIII) related to the electrical energy grid are satisfied:

$$0 \le \hat{P}^{Grid+}_{h,l} \le \overline{P}^{Grid+}_h (1 - v^{Grid}_{h,l}) \quad \text{(XII)}$$
$$0 \le \hat{P}^{Grid-}_{h,l} \le \overline{P}^{Grid-}_h v^{Grid}_{h,l}; \quad \text{(XIII)}$$

wherein
$\hat{P}_{h,l}^{Grid+}/\hat{P}_{h,l}^{Grid-}$ are positive variables with a maximum value equal to the contracted power form the electrical energy grid, $\overline{P}_h^{Grid+}/\overline{P}_h^{Grid-}$ by house h,
wherein $v_{h,l}^{Grid}$ is the binary variable modelling the selling/purchasing energy from house h to/from the electrical energy grid, assuming 1 for purchasing and 0 for selling; and wherein the following constraints (XIV) and (XV) related to the community are satisfied:

$$0 \le \hat{P}^{Com+}_{h,l} \le \overline{P}^{Com+}_h (1 - v^{Com}_{h,l}) \quad \text{(XIV)}$$
$$0 \le \hat{P}^{Com-}_{h,l} \le \overline{P}^{Com-}_h v^{Com}_{h,l} \quad \text{(XV)}$$

wherein
$\overline{P}_{h,l}^{Com+}/\overline{P}_{h,l}^{Com-}$ are positive variables with a maximum value equal to the maximum value exchangeable with the community, $\overline{P}_{h,l}^{Com+}/\overline{P}_h^{Com-}$ by house h, wherein $v_{h,l}^{Com}$ is the binary variable modelling the selling/purchasing energy from house h to/from the community, assuming 1 for selling and 0 for purchasing, and considering that it is not allowed to buy energy form the grid and sell energy to the community at the same time: $v_{h,l}^{Grid} + v_{h,l}^{Com} \le 1$;
wherein the energy balance of the community is given as (XVI):

$$\sum_{h=1}^{Nh} \hat{P}^{Com-}_{k,l} = \sum_{h=1}^{Nh} \hat{P}^{Com+}_{k,l}; \quad \text{(XVI)}$$

wherein the energy balance of house h in the community can be obtained by several ways, selected by the community:

m1) if there are no restrictions on the transfer of energy between the community, the energy balance of house h is given by the equality restriction:

$$\hat{P}^{PV}_{h,l} + \hat{P}^{B+}_{h,l} + \hat{P}^{Grid-}_{h,l} + \hat{P}^{Com-}_{h,l} = \quad \text{(XVII)}$$
$$\hat{P}^{B-}_{h,l} + \hat{P}^{Grid+}_{h,l} + \hat{P}^{NMC}_{h,l} + \hat{P}^{NC}_{h,l} + \hat{P}^{MC}_{h,l} + \hat{P}^{CC}_{h,l} + \hat{P}^{Com+}_{h,l}$$

wherein $\hat{P}_{h,l}^{PV}$ is the estimate of the alternate current power generated by the PV installation of house h at instant I; wherein $\hat{P}_{h,I}^{B+}/\hat{P}_{h,I}^{B-}$ is the estimate of the discharged or charged power of the battery bank of house h at instant I;

wherein the $\hat{P}_{h/I}^{NMC}$ term relates to the estimate of the active power of house h being consumed at instant I by devices that are not monitored neither controlled, the $\hat{P}_{h,I}^{NC}$ term relates to the estimate of the active power of house h being consumed at instant/by devices that are monitored but not controlled, the $\hat{P}_{h/I}^{MC}$ term relates to the estimate of the active power of house h being consumed at instant/by devices manually controlled, and the PCC term relates to the estimate of the active power of house h being consumed at instant/by devices that are computer controlled;

m2) energy balance of house h (VIII) in the community, if it is not allowed the transfer of energy between the community, is given by the equality restriction:

$$\hat{P}_{h,I}^{Com-} = P_{h,I}^{Com+} = 0 \Longrightarrow$$
$$\Longrightarrow \hat{P}_{h,I}^{PV} + \hat{P}_{h,I}^{B+} + \hat{P}_{h,I}^{Grid-} = \hat{P}_{h,I}^{B-} + \hat{P}_{h,I}^{Grid+} + \hat{P}_{h,I}^{NMC} + \hat{P}_{h,I}^{NC} + \hat{P}_{h,I}^{MC} + \hat{P}_{h,I}^{CC}$$

m3) wherein the energy is shared between the houses using energy sharing coefficients Bh, as shown in the formulas (XIX) e (XX):

$$\hat{P}_{h,I}^{Com+} = \hat{P}_{h,I}^{PV} \Longrightarrow \tag{XIX}$$
$$\Longrightarrow \hat{P}_{h,I}^{B+} + \hat{P}_{h,I}^{Grid-} + \hat{P}_{h,I}^{Com-} = \hat{P}_{h,I}^{B-} + \hat{P}_{h,I}^{Grid+} + \hat{P}_{h,I}^{NMC} + \hat{P}_{h,I}^{NC} + \hat{P}_{h,I}^{MC} + \hat{P}_{h,I}^{CC}$$

$$\hat{P}_{h,I}^{Com-} = \beta_{h,I} \sum_{h=1}^{Nh} \hat{P}_{h,I}^{PV}, \quad \sum_{h=1}^{Nh} \beta_{h,I} = 1, I = 1 \ldots PH, \tag{XX}$$

wherein said coefficients follow one of the following different alternatives (XXI):

$$\beta_{h,I} = \begin{cases} FC_{h,I} \in [0,1]; \text{ Fixed} \\ VC_{h,I} \in [0,1]; \text{ Variable} \\ \dfrac{\hat{P}_{h,I}}{\sum_{h=1}^{Nh} \hat{P}_{h,I}}; \text{ Consumption-based} \\ \dfrac{FC_{h,I}\hat{P}_{h,I}}{\sum_{I=1}^{Nh} FC_{h,I}\hat{P}_{h,I}}; \text{ Hybrid} \end{cases} \tag{XXI}$$

wherein $FC_{h,I}$ represent fixed coefficients, and $VC_{h,I}$ variable coefficients which are obtained through an optimization problem;

n) solution, by the aggregator computational unit (110), of the problem formulated in step m), using the receding horizon principle, wherein said solution includes the determination of all control actions, for the whole prediction horizon PH, but where only the ones calculated for the first step within PH will be sent to the corresponding data-acquisition systems (140), in step f);

o) update of the history for every model used;

wherein steps e) through o) are repeated every sampling interval Δk.

In other embodiments of the first aspect of the present invention, data do acquired in step a) is selected from the group consisting of:

tws, time basis for weather data;
R, global Solar Radiation;
T, atmospheric air temperature; and, for every house h:
$t_{Cons}$, time basis for consumption data;
$P_h$, active power of house h;
$R_h$, reactive power of house h,
$t_{Inv}$, time basis for inverter data;
$\{P_h^{PV}\}$, alternate power generated by the PV installation of house h,
$\{O_h\}$, daily occupation of house h; and, for every house h that has manually controlled appliances:
$StP_{h,j}/EndP_{h,j}$, $j \in \{MC_h\}$, start/end times of the operation of all manually controlled appliances of house h;
$\{P_{h,j}, j \in \{MC_h\}\}$, active Power of all Manually Controlled appliances of house h;

(XVIII)

$t_{MCh}$, time basis for all Manually Controlled appliances of house h; and for every house h that has Computer Controlled Appliances that are not air conditioning systems:
$\{U_{h,j}, j \in \{CC_h\}\}$ control actions for all appliances of house h to be computer controlled;
$\{P_{h,j}, j \in \{CC_h\}\}$, active power of all appliances of house h to be Computer Controlled;
$t_{cCh}$, Time basis for all Computer Controlled appliances of house h; and for every house h that has Computer Controlled air conditioning systems:
$\{IT_h^{room}, room \in \{AC_h\}\}$, Air temperature for all air conditioning systems of house h to be Computer Controlled;
$\{RH_h^{room}, room \in \{AC_h\}\}$, Relative humidity for all air conditioning systems of house h to be Computer Controlled;
$\{WT_h^{room}, room \in \{AC_h\}\}$ Wall temperature for all air conditioning systems of house h to be Computer Controlled;
$\{P_h^{room}, room \in \{AC_h\}\}$, Active Power for all air conditioning systems of house h to be Computer Controlled;
$\{U_h^{room}, room \in \{AC_h\}\}$, Control Actions for all air conditioning systems of house h to be Computer Controlled;
$t_{Ach}$, Time basis for all air conditioning systems of house h to be Computer Controlled; and for every house h that has Monitored but not Controlled appliances:

{StP$_{h,j}$/EndP$_{h,j}$, j∈{M$_h$}}, Start/end times of the operation of all Monitored appliances of house h;

{P$_{h,j}$, j∈{M$_h$}}, Active Power of all Monitored appliances of house h;

t$_{Mh}$—Time basis for all Monitored appliances of house h.

Yet in other embodiments of the first aspect of the present invention, the initial values $v_0$ of step b) are at least one selected from the group consisting of, for all houses with a photovoltaic energy generation subsystem:

$\overline{P}_h^{Grid-}/\overline{P}_h^{Grid+}$ contracted bought(-)/sold(+) power from/to an electrical energy grid by each house h; and for all houses with a photovoltaic energy generation subsystem and battery:

$\overline{P}_h^{B-}/\overline{P}_h^{B+}$ maximum discharged/charged power of a battery bank of at least one house h;

$\underline{SOC}_h, \overline{SoC}_h$ minimum/maximum value of the state of charge of a battery bank of a house h;

$SoC_{h,initial}$ initial state of charge of a battery bank of a house h;

$RU_h/RD_h$ maximum values of ramp-up/ramp down rates for charging or discharging of a battery bank of a house h;

$\eta_h^{B-}/\eta_h^{B+}$ charging/discharging efficiency of a battery bank of a house h;

$\overline{E}_h^B$ rated capacity of a battery bank of a house h; and, for all houses with computer-controlled air conditioning systems:

$t_s$ start time when a room must be in thermal comfort;

$t_e$ end time when a room must be in thermal comfort;

Δt time interval before the start of the schedule when an air conditioning system needs to operate to ensure thermal comfort throughout a whole period;

$\Theta_T$ predicted mean value threshold.

Still in other embodiments of the first aspect of the present invention, the prediction horizon is between 1 hour and 30 days, preferably between 2 hours and 15 days, and most preferably the prediction horizon is 1 day.

Yet in other embodiments of the first aspect of the present invention, weather data $d_4$ is retrieved from a weather database and/or data $d_4$ is sent by a weather station (120).

In certain embodiments of the first aspect of the present invention, the computer implemented method for community energy management (1000) further comprises the following substep:

h4) reception of data $d_7$ related to climate information about at least one room in at least one house in the community, sent by at least one sensor (150), wherein the at least one sensor (150) is electrically powered; and wherein substep h4) is carried out within step h).

In other embodiments of the first aspect of the present invention, the sampling interval Δk belongs to the interval from 5 minutes to 1 hour, most preferably the sampling interval Δk is 15 minutes and that the sampling interval $Δk_1$ belongs to the interval between 10 seconds to 2 minutes, most preferably the sampling interval $Δk_1$ is 1 minute.

Yet in other embodiments of the first aspect of the present invention, the computer-controlled devices are selected from the group consisting of air conditioning systems, battery banks (190), swimming pool pumps, or any other electric device capable of being controlled remotely, namely using a smart plug (180).

In certain embodiments of a second aspect, the present invention relates to a community energy management system (100) comprising:

a source of weather-related data $d_4$ wherein such data $d_4$ is at least one of the group consisting of air temperature, relative humidity, global solar radiation;

an aggregator computational unit (110) for community energy management system comprising:
  a communication unit (11), configured to communicate with one or more data acquisition systems (140), one or more consumption energy meter (130), one or more inverter energy meter (160), one or more sensors (150), one or more smart plugs (180);
  a processing unit (12);
  a data storage unit (13), configured to store data before, during or after processing by the processing unit (12);

at least one energy generation photovoltaic subsystem, comprised of photovoltaic panels and one inverter;

at least one battery bank (190), configured to store energy produced by the at least one energy generation photovoltaic subsystem;

at least one data acquisition subsystem (140) installed in each house h of the community;

at least one consumption energy meter (130) configured to measure the energy consumption at each house h;

at least one inverter energy meter (160) configured to measure the energy produced at each house h;

at least one smart plug (180), configured to switch on and off electrical equipment connected thereof;

at least one cloud-based server (115);

wherein the aggregator computational unit (110) is configured to carry out the method according to the first aspect of the invention.

In certain embodiments of the second aspect, the community energy management system (100) according to the invention further comprises:

one or more indoor sensors (150) configured to measure at least one quantity from the group consisting of air temperature, relative humidity, wall temperature.

Yet in certain embodiments of the second aspect, the community energy management system (100) according to the invention further comprises:

the source of weather-related data $d_4$ is a weather station (120) configured to measure $d_4$ wherein such data $d_4$ is selected from the group consisting of air temperature, relative humidity, global solar radiation.

Yet in certain embodiments of the second aspect, the aggregator computational unit (110) is selected from the group consisting of a server, a desktop computer, a laptop computer, or a combination thereof.

In a third aspect, the invention relates to a computer program product comprising logic instructions which, when executed by a computer of the community energy management system (100) of the second aspect, cause the computer to carry out the method of the first aspect of the present invention.

In a fourth aspect, the invention relates to a computer-readable storage medium comprising instructions which, when executed by a computer of the community energy management system (100) of the second aspect, cause the computer to carry out the method of the first aspect of the present invention.

Definitions

Throughout this application, the terms "around" and "approximately" mean that the value to which they refer could also be within a range of plus and minus 10% of the mentioned value.

As used in this application, the term "or" is to be interpreted in an inclusive meaning instead of the exclusive meaning, unless otherwise clearly stated. That is, an expression like "X utilizes A or B" shall be interpreted as including all possible combinations, i.e., "X utilizes A", "X utilizes B", and "X utilizes A and B".

As used in this application, the indefinite article "a", "an", shall be interpreted as including "one" or "one or more", unless otherwise clearly stated.

Throughout this application, the examples provided shall be interpreted as having the purpose to illustrate one or more examples of embodiments of the present invention and shall not be interpreted as preferences, unless otherwise clearly stated.

As used throughout the present application, the terms "comprise/comprises", "comprising", "include/includes", "including" specify the presence of the features, elements, components, steps, and related operations, and do not exclude whatsoever the presence of further features, elements, components, steps, and related operations.

The subject-matter above-described is provided as an illustration of the present invention and shall not be interpreted as limiting it. The terminology used with the purpose of describing specific embodiments according to the present invention, shall not be interpreted as a limitation of the invention.

REFERENCE SIGNS LIST

11—communication unit
12—processing unit
13—data storage unit (memory, data base)
100—system according to the invention
110—aggregator computational unit
115—cloud-based server
120—weather station
125—database (tariff-related data)
130—consumption energy meter
140—data acquisition subsystem
145—user interface
150—sensors
160—inverter energy meter
180—smart plug
190—computer-controlled equipment
1000—method according to the invention

CITATIONS LIST

In the following, the citations list is presented:

Patent Literature

CA2809011 A1, "Adaptative energy management system", priority date Nov. 6, 2012, published May 6, 2014, MacMaster University, CA.

Non-Patent Literature

[1] W. Su, A. Huang, in "The energy internet: An open energy platform to transform legacy power systems into open innovation and global economic engines", Woodhead Publishing, 2018.
[2] A. Manso-Burgos, D. Ribó-Pérez, T. Gómez-Navarro, M. Alcázar-Ortega, in "Local energy communities modelling and optimisation considering storage, demand configuration and sharing strategies: A case study in Valencia (Spain), Energy Reports." 8 (2022) 10395-10408.
[3] Khosravani, H. R.; Ruano, A. E.; Ferreira, P. M. A convex hull-based data selection method for data driven models. Applied Soft Computing 2016, 47, 515-533, doi:10.1016/j.eswa.2016.06.028.
[4] Silva, S.; Ruano, A. The IMBPC HVAC system: Wireless Sensors and IoT Platform. IFAC-PapersOnLine 2018, 51 1-8, doi:https://doi.org/10.1016/j.ifacol.2018.06.227.
[5] Ruano, A. E.; Pesteh, S.; Silva, S.; Duarte, H.; Mestre, G.; Ferreira, P. M.; Khosravani, H. R.; Horta, R. The IMBPC HVAC system: A complete MBPC solution for existing HVAC systems. Energy Build. 2016, 120, 145-158, doi:10.1016/j.enbuild.2016.03.043.
[6] Ferreira, P.; Ruano, A. Evolutionary Multiobjective Neural Network Models Identification: Evolving Task-Optimised Models. In New Advances in Intelligent Signal Processing, Ruano, A., Várkonyi-Kóczy, A., Eds.; Studies in Computational Intelligence; Springer Berlin/Heidelberg: 2011; Volume 372, pp. 21-53.

The invention claimed is:

1. A computer implemented method for community energy management (1000), characterized in that the method comprises the following steps:
   a) acquisition, by an aggregator computational unit (110), of data do that will be used for designing prediction models and appliance profiles, during a period of time;
   b) design, using a cloud-based server (115) of Radial Basis Function prediction models to use for predicting selected from the group consisting of: global solar radiation and atmospheric air temperature of the community, power consumption and power generation in each house h of the community, as well as operation and power consumption for all monitored appliances by Non-Invasive Load Monitoring models, wherein said design comprises the following substeps:
      b1) selection of the data available for design from the data do acquired in step a);
      b2) minimization of the model objectives through a Multi-Objective Genetic Algorithm;
      b3) analysis of the results of the Multi-Objective Genetic Algorithm, restricting some of the objectives minimized in step b2) and redefinition of the input space and/or model topology;
      b4) utilization of the preferred set of models obtained from a second Multi-Objective Genetic Algorithm execution;
      b5) determination of a second set of the preferred models $m_e^{pref}$ obtained in the previous substep through the following equation:

$$m_e^{pref} = \{m_{pref} : nw(m_{pref}) \leq \tilde{m}_{nw}^{pref}\} \cap \{m_{pref} : \text{fore}(m_{pref}) \leq \tilde{m}_{fore}^{pref}\}$$

wherein $m_{pref}$ is the set of preferred models obtained in the second Multi-Objective Genetic Algorithm execution, $\tilde{m}_{nw}^{pref}$ is the median of the linear weight norm for each model in $m_{pref}$ and $\tilde{m}_{fore}^{pref}$ the median of the sum of the forecasts for the prediction time-series obtained by models $m_{pref}$;
      b6) obtaining of a third set of models, $m_e^{par}$ from the previous step by using the following equation:

$$m_e^{par} = \{nd(\text{fore}(m_e^{pref}), nw(m_e^{pref})) : \#nd = NS\},$$

wherein nd(.) stands for non-dominated solutions and NS is its number;

b7) if the model that should be designed is a Nonlinear Auto-Regressive model with Exogeneous inputs, usage, by the cloud-based server (115) of $m_e^{par}$ for the exogenous variables;

c) determination of the power profiles for all monitored, manually controlled and computer-controlled appliances in the community, by the cloud-based server (115);

d) reception, by the aggregator computational unit (110), of all models designed in b), all power profiles determined in c), initial values $v_0$ and initial control actions, through a user-interface, as well as data history for all models supplied by a data acquisition subsystem (140) installed in each house h, one or more consumption energy meters (130) installed in at least one house h, one or more inverter energy meters (160) installed in at least one house h, one or more sensors (150) installed in at least one house h;

e) reception, by a data acquisition subsystem (140), of data related to house h, wherein said data is sent wirelessly and/or wired and wherein said reception includes the following substeps:

e1) reception of electric consumption data $d_1$ sent by a consumption energy meter (130) installed at each house h, wherein data $d_1$ comprise active power being consumed in house h at all instants $k_1$ within the sampling interval $\Delta k$, $P_{h,k_1}$, and reactive power being consumed in house h at all instants $k_1$ within the sampling interval $\Delta k$, $R_{h,k_1}$;

e2) reception of data $d_2$ related to at least one energy producing photovoltaic subsystem installed in at least one house h, sent by an inverter energy meter (160) wherein data $d_2$ comprise the power generated by at least one energy producing photovoltaic subsystem of house h at an instant k, $P_{h,k}^{PV}$; the power imported from the grid $P_{h,k}^{Grid-}$, and the power exported to the grid $P_{h,k}^{Grid+}$, wherein PV refers to photovoltaic;

e3) reception of data $d_3$ related to at least one battery bank installed in at least one house h, sent by an inverter energy meter (160) wherein data $d_3$ comprises at least the state of charge of the battery;

f) sending of the control actions determined in the previous steps, by the aggregator computational unit (110) to each data acquisition subsystem (140), which, in turn, sends the respective control actions to the computer-controlled devices in each house of the community, wherein the computer-controlled devices in each house are actuated and perform the respective control actions;

g) reception, by an aggregator computational unit (110), of the data $d_1$, $d_2$ and $d_3$ related to house h at an instant k, sent by the data acquisition subsystem (140);

h) reception, by the aggregator computational unit (110), of weather data $d_4$, related to the community, wherein said weather data $d_4$ comprises air temperature data and global solar radiation data;

i) reception of tariff-related data $d_5$ of each house h in the community, wherein said data $d_5$ is retrieved from a database (125) by the aggregator computational unit (110);

j) reception, by the aggregator computational unit (110), of occupation-related data $d_6$ of each house h, inserted in a database by each user via a user interface (145);

k) determination of the averaged active power consumption of each house:

$$P_{h,k} = \frac{P_{h,k_1}}{N}, N = \frac{\Delta k}{k_1};$$

l) calculation of forecasts for a user-specified Prediction Horizon PH of both the energy consumption of each individual house h and the energy generation of each energy producing photovoltaic apparatus in the community over the prediction horizon, by using one or more of the methods of the group consisting of naive forecasting methods, multi-step Nonlinear Auto-Regressive Exogenous forecasting models, AutoRegressive Integrated Moving Average, ARIMA, Classification and Regression Trees, CART, Wavelet, Fuzzy or Neuro-Fuzzy models, and an hybrid combination thereof; wherein the present calculation step comprises the following substeps:

l1) calculation of forecasts of consumption for the devices in each house that are not monitored and not controlled NMC, which is given as the sum of the active power of corresponding appliances in each house, given by:

$$\hat{P}_{h,\{k+1 \ldots k+PH\}}^{NMC} = \sum_{j=1}^{\#((NM_i)\cup(NC_i))} \hat{P}_{h,j,\{k+1 \ldots k+PH\}}; \quad (I)$$

for the devices in each house h that are not monitored and not controlled NMC by means of:

$$\hat{P}_{h,\{k+1 \ldots k+PH\}}^{NMC} = \hat{P}_{h,\{k+1 \ldots k+PH_{NARX}\}}^{NMC} \cup \hat{P}_{h,\{k+PH_{NARX}+1 \ldots k+PH\}}^{NMC} \quad (II)$$

wherein the first term in the right-hand-side of (II) refers to the use of the Nonlinear Auto-Regressive model with Exogeneous NARX model and the second term to the naïve forecast technique;

wherein $PH_{NARX}$ denotes the first steps within PH whose forecasts are obtained as the median of the outputs of the models $m_e^{pref}$:

$$\hat{P}_{h,\{k+1 \ldots k+PH_{NARX}\}}^{NMC} = \quad (III)$$
$$\{M_h^P(\overline{P}_{h,l}^{NMC}, \overline{T}_l, O_{h,l}, D_l), l = k+1 \ldots k+PH_{NARX}\};$$

wherein the second term is given as:

$$\hat{P}_{h,\{k+PH_{NARX}+1 \ldots k+PH\}}^{NMC} = P_{h,\{k+PH_{NARX}+1-\frac{24}{\Delta k} \ldots k+PH-\frac{24}{\Delta k}\}}^{NMC}, \quad (IV)$$

i.e., the value obtained one day ago;

wherein $\overline{P}_{h,l}^{NMC}$ denotes a set of past values relative to l of $P_{h,l}^{NMC}$, $\overline{T}_l$ denotes a set, of past values relative to l of $T_l$, $O_{h,l}$ denotes the daily occupation relative to instant l of house h, and $D_l$ corresponds to a codification of the day, within the week;

wherein as the multi-step iteration of (III) involves predictions of the atmospheric temperature, these forecasts will be given as a multi-step iteration of a NAR model:

$$\hat{T}_{\{k+1...k+PH_{NARX}\}} = \{M^T(\overline{T}_l), l = k+1 \ldots k+PH_{NARX}\}; \quad (V)$$

I2) calculation of forecasts of consumption for the devices in each house h that are monitored but not controlled NC, which is given as the sum of the active power of corresponding appliances in each house, given by:

$$\hat{P}^{NC}_{h,\{k+1...k+PH\}} = \sum_{j=1}^{\#(\{M_i\}\cap\{NC_i\})} \hat{P}_{h,j,\{k+1...k+PH\}}; \quad (VI)$$

wherein the forecasts of consumption of each device, $\hat{P}_{h,j,\{k+1 \ldots k+PH\}}$, are given by the joint application of Non-Invasive Load Monitoring NILM classification models configured to determine if the appliance is operating or is off for every instant in PH and, if the appliance is on, the estimate of consumption given by the NILM forecasting model, and the power profile of the appliance, determined offline and updated on-line;

I3) calculation of forecasts of consumption for the devices in each house that are manually controlled MC, which is given as the sum of the active power of corresponding appliances in each house, given by:

$$\hat{P}^{MC}_{h,\{k+1...k+PH\}} = \sum_{m=1}^{\#(\{MC_i\})} \hat{P}_{h,m,\{k+1...k+PH\}}; \quad (VII)$$

wherein the forecasts of consumption of each device $$\sum_{m=1}^{\#(\{MC_i\})} \hat{P}_{h,m,\{k+1...k+PH\}}$$

are obtained using the power profiles determined off-line;

I4) calculation of forecasts of consumption for the devices in each house that are computer controlled CC, which is given as the sum of the active power of corresponding appliances in each house, given by:

$$\hat{P}^{CC}_{h,\{k+1...k+PH\}} = \sum_{n=1}^{\#(\{CC_i\})} \hat{P}_{h,n,\{k+1...k+PH\}}; \quad (VIII)$$

wherein the operation of each appliance is given as the solution of the Mixed-Integer Linear Programming MILP problem carried out in step m), and whose consumption estimation can be given using the power profiles determined off-line;

I5) calculation of forecasts of photovoltaic power generation by means of a combination of the naive forecasting method and multi-step Nonlinear Auto-Regressive Exogenous NARX forecasting models for each energy generation photovoltaic subsystem in each house h comprising an energy generation photovoltaic subsystem; the NARX forecasts are given by:

i.

$$PV_{h,\{k+1...k+PH_{NARX}\}} = \{M_h^{PV}(\overline{PV}_{h,l}, \overline{T}_l, \overline{R}_l), l = k+1 \ldots k+PH_{NARX}\}; \quad (IX)$$

wherein R denotes global solar radiation,
wherein an additional forecasting model is needed for solar radiation over PH, to determine its evolution is used:

ii.

$$R_{\{k+1...k+36\}} = \{M^R(\overline{R}_l), l = k+1 \ldots k+36\} \quad (X)$$

m) formulation, by the aggregator computational unit (110), of a Mixed-Integer Linear Programming problem as indicated in formula (XI) below $$\min \hat{C}^{Com} = \min \sum_{h=1}^{Nh} \sum_{s=1}^{PH} \left(\hat{P}^{Grid-}_{h,l} + \hat{P}^{Com-}_{h,l}\right)\pi_l^{Grid-}\Delta k - \left(\hat{P}^{Grid+}_{h,l} + \hat{P}^{Com+}_{h,l}\right)\pi_l^{Grid+}\Delta k, l = k+s \quad (XI)$$

wherein
Nh denotes the number of houses in the community;
PH is a prediction horizon, and
Δk is the sampling interval;
$\hat{P}_{h,l}^{Grid-}/\hat{P}_{h,l}^{Grid+}$ are estimates of the active power P bought–/sold+ from/to an electrical energy grid at a sampling instant/by house h in the community;
$\hat{P}_{h,l}^{Com-}/\hat{P}_{h,l}^{Com+}$ are estimates of the active power P bought–/sold+ from/to the community at the sampling instant/by house h;
$\pi_l^{Grid-}/\pi_l^{Grid+}$ are the price of the energy bought–/sold+ from/to the community or the electrical energy grid at the sampling instant/;
wherein the following constraints (XII) and (XIII) related to the electrical energy grid are satisfied:

$$0 \leq \hat{P}^{Grid+}_{h,l} \leq \overline{P}^{Grid+}_h(1 - v^{Grid}_{h,l}) \quad (XII)$$

$$0 \leq \hat{P}^{Grid-}_{h,l} \leq \overline{P}^{Grid-}_h v^{Grid}_{h,l}; \quad (XIII)$$

wherein
$\hat{P}_{h,l}^{Grid+}/\hat{P}_{h,l}^{Grid-}$ are positive variables with a maximum value equal to the contracted power form the electrical energy grid, $\overline{P}_h^{Grid+}/\overline{P}_h^{Grid-}$ by house h,
wherein $v_{h,l}^{Com}$ is the binary variable modelling the selling/purchasing energy from house h to/from the electrical energy grid, assuming 1 for purchasing and 0 for selling; and
wherein the following constraints (XIV) and (XV) related to the community are satisfied:

$$0 \leq \hat{P}^{Com+}_{h,l} \leq \overline{P}^{Com+}_h(1 - v^{Com}_{h,l}) \quad (XIV)$$

$$0 \leq \hat{P}^{Com-}_{h,l} \leq \overline{P}^{Com-}_h v^{Com}_{h,l} \quad (XV)$$

wherein
$\hat{P}_{h,l}^{Com+}/\hat{P}_{h,l}^{Com-}$ are positive variables with a maximum value equal to the maximum value exchangeable with the community, $\overline{P}_h^{Com+}/\overline{P}_h^{Com-}$ by house h, wherein $v_{h,l}^{Com}$ is the binary variable modelling the selling/purchasing energy from house h to/from the community, assuming 1 for selling and 0 for purchasing, and considering that it is not allowed to buy energy form the grid and sell energy to the community at the same time: $v_{h,l}^{Grid}+v_{h,l}^{Com}\leq 1$;
wherein the energy balance of the community is given as (XVI):

$$\sum_{h=1}^{Nh} \hat{P}_{k,l}^{Com-} = \sum_{h=1}^{Nh} \hat{P}_{k,l}^{Com+}; \quad (XVI)$$

wherein the energy balance of house h in the community can be obtained by several ways, selected by the community:
  m1) if there are no restrictions on the transfer of energy between the community, the energy balance of house h is given by the equality restriction:

$$\hat{P}_{h,l}^{PV} + \hat{P}_{h,l}^{B+} + \hat{P}_{h,l}^{Grid-} + \hat{P}_{h,l}^{Com-} = \quad (XVII)$$
$$\hat{P}_{h,l}^{B-} + \hat{P}_{h,l}^{Grid+} + \hat{P}_{h,l}^{NMC} + \hat{P}_{h,l}^{NC} + \hat{P}_{h,l}^{MC} + \hat{P}_{h,l}^{CC} + \hat{P}_{h,l}^{Com+}$$

wherein $\hat{P}_{h,l}^{PV}$ is the estimate of the alternate current power generated by the PV installation of house h at instant $l$;
wherein $\hat{P}_{h,l}^{B+}/\hat{P}_{h,l}^{B-}$ is the estimate of the discharged or charged power of the battery bank of house h at instant $l$;
wherein the $\hat{P}_{h,l}^{NMC}$ term relates to the estimate of the active power of house h being consumed at instant/by devices that are not monitored and not controlled, the $\hat{P}_{h,l}^{NC}$ term relates to the estimate of the active power of house h being consumed at instant/by devices that are monitored but not controlled, the $\hat{P}_{h,l}^{MC}$ term relates to the estimate of the active power of house h being consumed at instant/by devices manually controlled, and the $\hat{P}_{h,l}^{CC}$ term relates to the estimate of the active power of house h being consumed at instant/by devices that are computer controlled;
  m2) energy balance of house h(VIII) in the community, if it is not allowed the transfer of energy between the community, is given by the equality restriction:

$$\hat{P}_{h,l}^{Com-} = P_{h,l}^{Com+} = 0 \Rightarrow \hat{P}_{h,l}^{PV} + \hat{P}_{h,l}^{B+} + \hat{P}_{h,l}^{Grid-} = \quad (XVIII)$$
$$\hat{P}_{h,l}^{B-} + \hat{P}_{h,l}^{Grid+} + \hat{P}_{h,l}^{NMC} + \hat{P}_{h,l}^{NC} + \hat{P}_{h,l}^{MC} + \hat{P}_{h,l}^{CC}$$

m3) wherein the energy is shared between the houses using energy sharing coefficients $\beta_{h,l}$ as shown in the formulas (XIX) e (XX):

$$\hat{P}_{h,l}^{Com+} = \hat{P}_{h,l}^{PV} \Rightarrow \hat{P}_{h,l}^{B+} + \hat{P}_{h,l}^{Grid-} + \hat{P}_{h,l}^{Com-} = \quad (XIX)$$
$$\hat{P}_{h,l}^{B-} + \hat{P}_{h,l}^{Grid+} + \hat{P}_{h,l}^{NMC} + \hat{P}_{h,l}^{NC} + \hat{P}_{h,l}^{MC} + \hat{P}_{h,l}^{CC}$$

$$\hat{P}_{h,l}^{Com-} = \beta_{h,l}\sum_{h=1}^{Nh}\hat{P}_{h,l}^{PV}, \sum_{h=1}^{Nh}\beta_{h,l} = 1, l = 1 \ldots PH, \quad (XX)$$

wherein said coefficients follow one of the following different alternatives (XXI):

$$\beta_{h,l} = \begin{cases} FC_{h,l} \in [0,1]; & \text{Fixed} \\ VC_{h,l} \in [0,1]; & \text{Variable} \\ \dfrac{\hat{P}_{h,l}}{\sum_{l=1}^{Nh}\hat{P}_{h,l}}; & \text{Consumption-based} \\ \dfrac{FC_{h,l}\hat{P}_{h,l}}{\sum_{l=1}^{Nh}FC_{h,l}\hat{P}_{h,l}}; & \text{Hybrid} \end{cases} \quad (XXI)$$

wherein $FC_{h,l}$ represent fixed coefficients, and $VC_{h,l}$ variable coefficients which are obtained through an optimization problem;
  n) solution, by the aggregator computational unit (110), of the problem formulated in step m), using the receding horizon principle, wherein said solution includes the determination of all control actions, for the whole prediction horizon PH, but where only the ones calculated for the first step within PH will be sent to the corresponding data-acquisition systems (140), in step f);
  o) update of the history for every model used;
wherein steps e) through o) are repeated every sampling interval $\Delta k$.

2. The computer implemented method for community energy management (1000) according to the precedent claim 1, characterized in that data do acquired in step a) is selected from the group consisting of:
  tws, time basis for weather data;
  R, global Solar Radiation;
  T, atmospheric air temperature; and, for every house h:
  $t_{Cons}$, time basis for consumption data:
  $P_h$, active power of house h;
  $R_h$, reactive power of house h,
  $t_{Inv}$, time basis for inverter data;
  $\{P_h^{PV}\}$, alternate power generated by the PV installation of house h,
  $\{O_h\}$, daily occupation of house h; and, for every house h that has manually controlled appliances:
  $StP_{h,j}/EndP_{h,j}$, $j\in \{MC_h\}$, start/end times of the operation of all manually controlled appliances of house h;
  $\{P_{h,j}, j\in \{MC_h\}\}$, active Power of all Manually Controlled appliances of house h;
  $t_{MCh}$, time basis for all Manually Controlled appliances of house h; and for every house h that has Computer Controlled Appliances that are not air conditioning systems:
  $\{U_{h,j}, j\in \{CC_h\}\}$ control actions for all appliances of house h to be computer controlled;
  $\{P_{h,j}, j\in \{CC_h\}\}$, active power of all appliances of house h to be Computer Controlled;
  $t_{cCh}$, Time basis for all Computer Controlled appliances of house h; and for every house h that has Computer Controlled air conditioning systems:
  $\{IT_h^{room}, room\in \{AC_h\}\}$, Air temperature for all air conditioning systems of house h to be Computer Controlled;
  $\{RHP_h^{room}, room\in \{AC_h\}\}$, Relative humidity for all air conditioning systems of house h to be Computer Controlled;
  $\{WT_h^{room}, room\in \{AC_h\}\}$ Wall temperature for all air conditioning systems of house h to be Computer Controlled;
  $\{P_h^{room}, room\in \{AC_h\}\}$, Active Power for all air conditioning systems of house h to be Computer Controlled;

$\{U_h^{room}, room \in \{AC_h\}\}$, Control Actions for all air conditioning systems of house h to be Computer Controlled;

$t_{Ach}$, Time basis for all air conditioning systems of house h to be Computer Controlled; and for every house h that has Monitored but not Controlled appliances:

$StP_{h,j}/EndP_{h,j}, j \varepsilon \{MC_h\}\}$, Start/end times of the operation of all Monitored appliances of house h;

$\{P_{h,j}, j \in \{M_h\}\}$, Active Power of all Monitored appliances of house h;

$t_{Mh}$—Time basis for all Monitored appliances of house h.

3. The computer implemented method for community energy management (1000) according to claim 1, characterized in that the initial values $v_0$ of step b) are at least one selected from the group consisting of, for all houses with a photovoltaic energy generation subsystem:

$\overline{P}_h^{Grid-}/\overline{P}_h^{Grid+}$ contracted bought(−)/sold(+) power from/to an electrical energy grid by each house h; and for all houses with a photovoltaic energy generation subsystem and battery:

$\overline{P}_h^{B-}/\overline{P}_h^{B+}$ maximum discharged/charged power of a battery bank of at least one house h;

$\underline{SOC}_h, \overline{SoC}_h$ minimum/maximum value of the state of charge of a battery bank of a house h;

$SoC_{h,initial}$ initial state of charge of a battery bank of a house h;

$RU_h/RD_h$ maximum values of ramp-up/ramp down rates for charging or discharging of a battery bank of a house h;

$\eta_h^{B-}/\eta_h^{B+}$ charging/discharging efficiency of a battery bank of a house h;

$\overline{E}_h^B$ a battery bank of a house h; and, for all houses with computer-controlled air conditioning systems:

$t_s$ start time when a room must be in thermal comfort;

$t_e$ end time when a room must be in thermal comfort;

$\Delta t$ time interval before the start of the schedule when an air conditioning system needs to operate to ensure thermal comfort throughout a whole period;

$\theta_T$ predicted mean value threshold.

4. The computer implemented method for community energy management (1000) according to claim 1, characterized in that the prediction horizon is between 1 hour and 30 days.

5. The computer implemented method for community energy management (1000) according to claim 1, characterized in that weather data $d_4$ is retrieved from a weather database and/or data $d_4$ is sent by a weather station (120).

6. The computer implemented method for community energy management (1000) according to claim 1, characterized in that the method further comprises the following substep:

h4) reception of data $d_7$ related to climate information about at least one room in at least one house in the community, sent by at least one sensor (150), wherein the at least one sensor (150) is electrically powered; and wherein substep h4) is carried out within step h).

7. The computer implemented method for community energy management (1000) according to claim 1, characterized in that the sampling interval $\Delta k$ belongs to the interval from 5 minutes to 1 hour, and that the sampling interval $\Delta k_1$ belongs to the interval between 10 seconds to 2 minutes.

8. The computer implemented method for community energy management (1000) according to claim 1, characterized in that the computer-controlled devices are selected from the group consisting of air conditioning systems, battery banks (190), swimming pool pumps, or another electric device capable of being controlled remotely using a smart plug (180).

9. A community energy management system (100) comprising:

a source of weather-related data $d_4$ wherein such data $d_4$ is at least one of the group consisting of air temperature, relative humidity, global solar radiation;

an aggregator computational unit (110) for community energy management system comprising:

a communication unit (11), configured to communicate with one or more data acquisition systems (140), one or more consumption energy meter (130), one or more inverter energy meter (160), one or more sensors (150), one or more smart plugs (210);

a processing unit (12);

a data storage unit (13), configured to store data before, during or after processing by the processing unit (12);

at least one energy generation photovoltaic subsystem, comprised of photovoltaic panels and one inverter;

at least one battery bank (190), configured to store energy produced by the at least one energy generation photovoltaic subsystem;

at least one data acquisition subsystem (140) installed in each house h of the community;

at least one consumption energy meter (130) configured to measure the energy consumption at each house h;

at least one inverter energy meter (160) configured to measure the energy produced at each house h;

at least one smart plug (180), configured to switch on and off electrical equipment connected thereof;

at least one cloud-based server (115);

characterized in that the aggregator computational unit (110) is configured to carry out the method as defined in claim 1.

10. The community energy management system (100) according to the precedent claim 9 characterized in that it further comprises:

one or more indoor sensors (150) configured to measure at least one quantity from the group consisting of air temperature, relative humidity, wall temperature.

11. The community energy management system (100) according to claim 9, characterized in that it further comprises:

the source of weather-related data $d_4$ is a weather station (120) configured to measure $d_4$ wherein such data $d_4$ is selected from the group consisting of air temperature, relative humidity, global solar radiation.

12. The community energy management system (100) according to claim 9, characterized in that the aggregator computational unit (110) is selected from the group consisting of a server, a desktop computer, a laptop computer, or a combination thereof.

13. A non-transitory computer program product characterized in that the non-transitory computer program product comprises logic instructions which, when executed by a computer of a community energy management system (100), cause the computer to carry out the method of claim 1.

14. A non-transitory computer-readable storage medium characterized in that the non-transitory computer-readable storage medium comprises instructions which, when executed by a computer of the community energy management system (100), cause the computer to carry out the method of claim 1.

* * * * *